(12) United States Patent
Himeno et al.

(10) Patent No.: US 9,318,928 B2
(45) Date of Patent: Apr. 19, 2016

(54) BRUSHLESS MOTOR, DISK DRIVE APPARATUS AND BRUSHLESS MOTOR MANUFACTURING METHOD

(71) Applicant: NIDEC CORPORATION, Kyoto (JP)

(72) Inventors: Toshikazu Himeno, Kyoto (JP); Hongbing Du, Singapore (SG); Junichi Hashimoto, Kyoto (JP); Kazuya Enokizono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 284 days.

(21) Appl. No.: 13/856,055

(22) Filed: Apr. 3, 2013

(65) Prior Publication Data

US 2013/0257229 A1 Oct. 3, 2013

Related U.S. Application Data

(60) Provisional application No. 61/619,625, filed on Apr. 3, 2012.

(51) Int. Cl.
*H02K 5/167* (2006.01)
*H02K 15/02* (2006.01)
(Continued)

(52) U.S. Cl.
CPC ............ *H02K 5/167* (2013.01); *H02K 7/085* (2013.01); *H02K 15/02* (2013.01); *H02K 21/24* (2013.01); *H02K 2213/03* (2013.01)

(58) Field of Classification Search
CPC ....... H02K 15/02; H02K 21/24; H02K 5/167; H02K 7/085; H02K 2213/03
USPC ................... 310/268, 40 MM, 425, 67 R, 90; 360/98.08, 99.12, 97.02
See application file for complete search history.

(56) References Cited

U.S. PATENT DOCUMENTS 3,189,770 A * 6/1965 Henry-Baudot ......... H02K 3/26
310/156.34
3,984,709 A * 10/1976 Kuwako ................. H02K 21/38
310/154.05

(Continued)

FOREIGN PATENT DOCUMENTS

CN 103368347 A 10/2013
CN 103368350 A 10/2013

(Continued)

OTHER PUBLICATIONS

English abstract of JP 06-189491 Date: Jul. 1994, Japan, Oku Yoshito.*

(Continued)

*Primary Examiner* — Terrance Kenerly
*Assistant Examiner* — Ahmed Elnakib
(74) *Attorney, Agent, or Firm* — Westerman, Hattori, Daniels & Adrian, LLP

(57) ABSTRACT

A brushless motor includes a plate-shaped armature and a magnet facing either one of a top surface and a bottom surface of the armature. An inner peripheral surface of a base member and an outer peripheral surface of a bearing mechanism contact with each other or face each other in a diametrical direction with an adhesive therebetween in a first fixing part. Further, a rotor yoke and a hub protrusion contact with each other or face each other in a diametrical direction with an adhesive therebetween in a second fixing part. Then, a press-fitting or adhesion is carried out in the other of the first and the second fixing part.

20 Claims, 15 Drawing Sheets

(51) Int. Cl.
*H02K 21/24* (2006.01)
*H02K 7/08* (2006.01)

(56) References Cited

U.S. PATENT DOCUMENTS

| | | | |
|---|---|---|---|
| 3,988,024 A * | 10/1976 | Watanabe | G11B 15/32 310/237 |
| 4,336,475 A | 6/1982 | Morinaga et al. | |
| 4,987,333 A * | 1/1991 | Noguchi | H02K 7/1004 310/268 |
| 5,498,919 A * | 3/1996 | Bahn | H02K 29/08 310/156.05 |
| 5,559,382 A * | 9/1996 | Oku | F16C 17/026 310/67 R |
| 5,587,617 A | 12/1996 | Dunfield et al. | |
| 5,598,048 A | 1/1997 | Dunfield et al. | |
| 5,635,783 A * | 6/1997 | Lee | H02K 5/1675 310/67 R |
| 5,796,193 A * | 8/1998 | Sakano | G11B 19/2009 310/103 |
| 5,969,909 A * | 10/1999 | Cheong | G11B 5/53 360/130.24 |
| 6,195,226 B1 * | 2/2001 | Papst | H02K 21/24 360/99.08 |
| 6,445,096 B1 | 9/2002 | Saito et al. | |
| 6,801,388 B2 | 10/2004 | Kayama et al. | |
| 2001/0051287 A1 * | 12/2001 | Kikitsu | G11B 5/00 428/820.6 |
| 2009/0072642 A1 * | 3/2009 | Miyamori | G11B 19/2009 310/90 |
| 2010/0072850 A1 * | 3/2010 | Miyata | H02K 21/24 310/156.12 |
| 2011/0084575 A1 * | 4/2011 | Kim | G11B 19/2018 310/425 |
| 2011/0255191 A1 | 10/2011 | Watanabe et al. | |
| 2012/0182856 A1 * | 7/2012 | Yoo | H02K 5/1675 369/258.1 |
| 2013/0258522 A1 | 10/2013 | Himeno et al. | |

FOREIGN PATENT DOCUMENTS

| | | |
|---|---|---|
| JP | 55-26030 A | 2/1980 |
| JP | 63-121462 A | 5/1988 |
| JP | 04-58752 A | 2/1992 |
| JP | 06-189491 * | 7/1994 |
| JP | 03-046612 * | 5/2000 |
| JP | 2002-325413 A | 11/2002 |
| JP | 2005-160202 A | 6/2005 |
| JP | 2005-348572 A | 12/2005 |
| JP | 2006-325329 A | 11/2006 |
| JP | 2011-223820 A | 11/2011 |
| SG | 135981 A1 | 10/2007 |
| SG | 193668 A1 | 10/2013 |

OTHER PUBLICATIONS

English abstract of JP 03-046612 Date: May 2000, Japan, Tadao et al.*
Sumi et al., U.S. Appl. No. 13/867,860, filed Jan. 31, 2013.
Himeno et al., U.S. Appl. No. 13/780,327, filed Feb. 28, 2013.
Himeno et al., U.S. Appl. No. 13/867,505, filed Apr. 22, 2013.

* cited by examiner

BRUSHLESS MOTOR, DISK DRIVE APPARATUS AND BRUSHLESS MOTOR MANUFACTURING METHOD

FIELD

The present invention relates to a brushless motor, a disk drive apparatus and a brushless motor manufacturing method.

BACKGROUND

A hard disk apparatus is equipped with a brushless motor for rotating a disk. A conventional brushless motor is disclosed in, e.g., SG185981. A permanent-magnet synchronous motor of SG185981 includes a permanent magnet mounted to at least one of a top yoke and a bottom yoke and an armature arranged within an air gap between the permanent magnet and the other yoke.

When assembling a brushless motor, an inner member is inserted or fitted into an outer member. If necessary, the inner member and the outer member are fixed to each other through the use of an adhesive agent. In particular, an armature is axially opposed to a magnet. In a so-called axial-gap-type brushless motor, a plurality of members is intricately arranged in an axially overlapping relationship. For that reason, in a process of manufacturing the axial-gap-type brushless motor, it is sometimes the case that bonding or press-fitting is performed with respect to a plurality of fixing portions during one insertion work in which two units are combined together. A demand has existed for a technology capable of accurately fixing individual members in the fixing portions.

SUMMARY

A brushless motor according to a first illustrative invention of the subject application includes a stationary unit and a rotary unit rotatably supported with respect to the stationary unit through a bearing mechanism. The stationary unit includes a flat armature and a base member. The flat armature arranged radially outward of the bearing mechanism to extend in a direction orthogonal to a center axis extending in an up-down direction. The base member includes a base through-hole extending in the up-down direction. The base member is arranged to support the armature. The rotary unit includes a hub, a rotor yoke made of a magnetic material, and a magnet. The hub includes a top plate portion made of a magnetic material and a hub protrusion portion made of a magnetic material and arranged to extend downward from the top plate portion. The rotor yoke is fixed to the hub protrusion portion and is positioned below the armature. The magnet is fixed to the hub or the rotor yoke and is opposed to one of upper and lower surfaces of the armature.

The base member includes an inner circumferential surface defining the base through-hole. The bearing mechanism includes an outer circumferential surface. The inner circumferential surface of the base member is arranged to make contact with the outer circumferential surface of the bearing mechanism or to radially oppose the outer circumferential surface of the bearing mechanism across an adhesive agent in a first fixing portion. The rotor yoke is arranged to make contact with the hub protrusion portion or to radially oppose the hub protrusion portion across an adhesive agent in a second fixing portion.

An axial length between a lower end of a constant diameter surface of the bearing mechanism extending along the first fixing portion or further extending downward from the first fixing portion and an upper end of a constant diameter surface of the base member extending along the first fixing portion or further extending upward from the first fixing portion is assumed to be d1. An axial length between a lower end of a constant diameter surface of the hub protrusion portion extending along the second fixing portion or further extending downward from the second fixing portion and an upper end of a constant diameter surface of the rotor yoke extending along the second fixing portion or further extending upward from the second fixing portion is assumed to be d2. The d1 and the d2 are set to satisfy a relationship of d1>d2.

With the first illustrative invention of the subject application, the respective members are substantially coaxially located in position on the basis of the first fixing portion. As a result, the rotor yoke and the hub protrusion portion are accurately fixed to each other in the second fixing portion.

A brushless motor according to a second illustrative invention of the subject application includes a stationary unit and a rotary unit rotatably supported with respect to the stationary unit through a bearing mechanism. The stationary unit includes a flat armature and a base member. The flat armature is arranged radially outward of the bearing mechanism to extend in a direction orthogonal to a center axis extending in an up-down direction. The base member includes a base through-hole extending in the up-down direction. The base member is arranged to support the armature. The rotary unit includes a hub, a rotor yoke made of a magnetic material, and a magnet. The hub includes a top plate portion made of a magnetic material and a hub protrusion portion made of a magnetic material and arranged to extend downward from the top plate portion. The rotor yoke is fixed to the hub protrusion portion and is positioned below the armature. The magnet is fixed to the hub or the rotor yoke and is opposed to one of upper and lower surfaces of the armature.

The base member includes an inner circumferential surface defining the base through-hole. The bearing mechanism includes an outer circumferential surface. The inner circumferential surface of the base member is arranged to make contact with the outer circumferential surface of the bearing mechanism or to radially oppose the outer circumferential surface of the bearing mechanism across an adhesive agent in a first fixing portion. The rotor yoke is arranged to make contact with the hub protrusion portion or to radially oppose the hub protrusion portion across an adhesive agent in a second fixing portion.

An axial length between a lower end of a constant diameter surface of the bearing mechanism extending along the first fixing portion or further extending downward from the first fixing portion and an upper end of a constant diameter surface of the base member extending along the first fixing portion or further extending upward from the first fixing portion is assumed to be d1. An axial length between a lower end of a constant diameter surface of the hub protrusion portion extending along the second fixing portion or further extending downward from the second fixing portion and an upper end of a constant diameter surface of the rotor yoke extending along the second fixing portion or further extending upward from the second fixing portion is assumed to be d2. The d1 and the d2 are set to satisfy a relationship of d1<d2.

With the second illustrative invention of the subject application, the respective members are substantially coaxially located in position on the basis of the second fixing portion. As a result, the base member and the bearing mechanism are accurately fixed to each other in the first fixing portion.

A method for manufacturing a brushless motor according to a third illustrative invention of the subject application is provided. The brushless motor includes a bearing mechanism, a flat armature, a base member arranged to support the armature, a hub, a rotor yoke made of a magnetic material, and a magnet. The armature is arranged radially outward of the bearing mechanism to extend in a direction orthogonal to a center axis extending in an up-down direction. The hub is arranged to rotate with respect to the base member. The rotor yoke is fixed to the hub and is positioned below the armature. The magnet is fixed to the hub or the rotor yoke and is opposed to one of upper and lower surfaces of the armature. The method according to the third illustrative invention includes steps a), b) and c). In the step a), a first unit including the base member, the armature and the rotor yoke is prepared. In the step b), a second unit including the bearing mechanism, the hub and the magnet is prepared. In the step c), the first unit and the second unit are combined together. The step c) includes steps c1) and c2). In the step c1), an inner circumferential surface of the base member is caused to make contact with an outer circumferential surface of the bearing mechanism or to radially oppose the outer circumferential surface of the bearing mechanism across an adhesive agent. In the step c2), after the step c1), the hub is caused to make contact with the rotor yoke or to radially oppose the rotor yoke across an adhesive agent.

With the third illustrative invention of the subject application, the hub can be accurately fixed with respect to the rotor yoke.

A method for manufacturing a brushless motor according to a fourth illustrative invention of the subject application is provided. The brushless motor includes a bearing mechanism, a flat armature, a base member arranged to support the armature, a hub, a rotor yoke made of a magnetic material, and a magnet. The armature is arranged radially outward of the bearing mechanism to extend in a direction orthogonal to a center axis extending in an up-down direction. The hub is arranged to rotate with respect to the base member. The rotor yoke is fixed to the hub and is positioned below the armature. The magnet is fixed to the hub or the rotor yoke and is opposed to one of upper and lower surfaces of the armature. The method according to the fourth illustrative invention includes steps a), b) and c). In the step a), a first unit including the base member, the armature and the rotor yoke is prepared. In the step b), a second unit including the bearing mechanism, the hub and the magnet is prepared. In the step c), the first unit and the second unit are combined together. The step c) includes steps c1) and c2). In the step c1), the hub is caused to make contact with the rotor yoke or to radially oppose the rotor yoke across an adhesive agent. In the step c2), after the step c1), an inner circumferential surface of the base member is caused to make contact with an outer circumferential surface of the bearing mechanism or to radially oppose the outer circumferential surface of the bearing mechanism across an adhesive agent.

With the fourth illustrative invention of the subject application, the bearing mechanism can be accurately fixed with respect to the base member.

The above and other elements, features, steps, characteristics and advantages of the present invention will become more apparent from the following detailed description of the preferred embodiments of the present invention with reference to the attached drawings.

DESCRIPTION OF EMBODIMENTS

Hereinafter, illustrative embodiments of the present invention will now be described with reference to the accompanying drawings. In the subject application, the direction parallel to the center axis of a brushless motor will be referred to as "axial". The direction orthogonal to the center axis of the brushless motor will be referred to as "radial". The direction extending along an arc about the center axis of the brushless motor will be referred to as "circumferential". In the subject application, the shape and positional relationship of the respective portions will be described under the assumption that the axial direction extends in an up-down direction and that the side of a hub with respect to a base member is upper. However, the up-down direction is defined merely for the sake of convenience in description and is not intended to limit the direction in the manufacture and use of the brushless motor and the disk drive apparatus according to the present invention.

In the subject application, the term "parallel" is intended to include a substantially parallel direction. Likewise, the term "orthogonal" is intended to include a substantially orthogonal direction.

Figure 1:
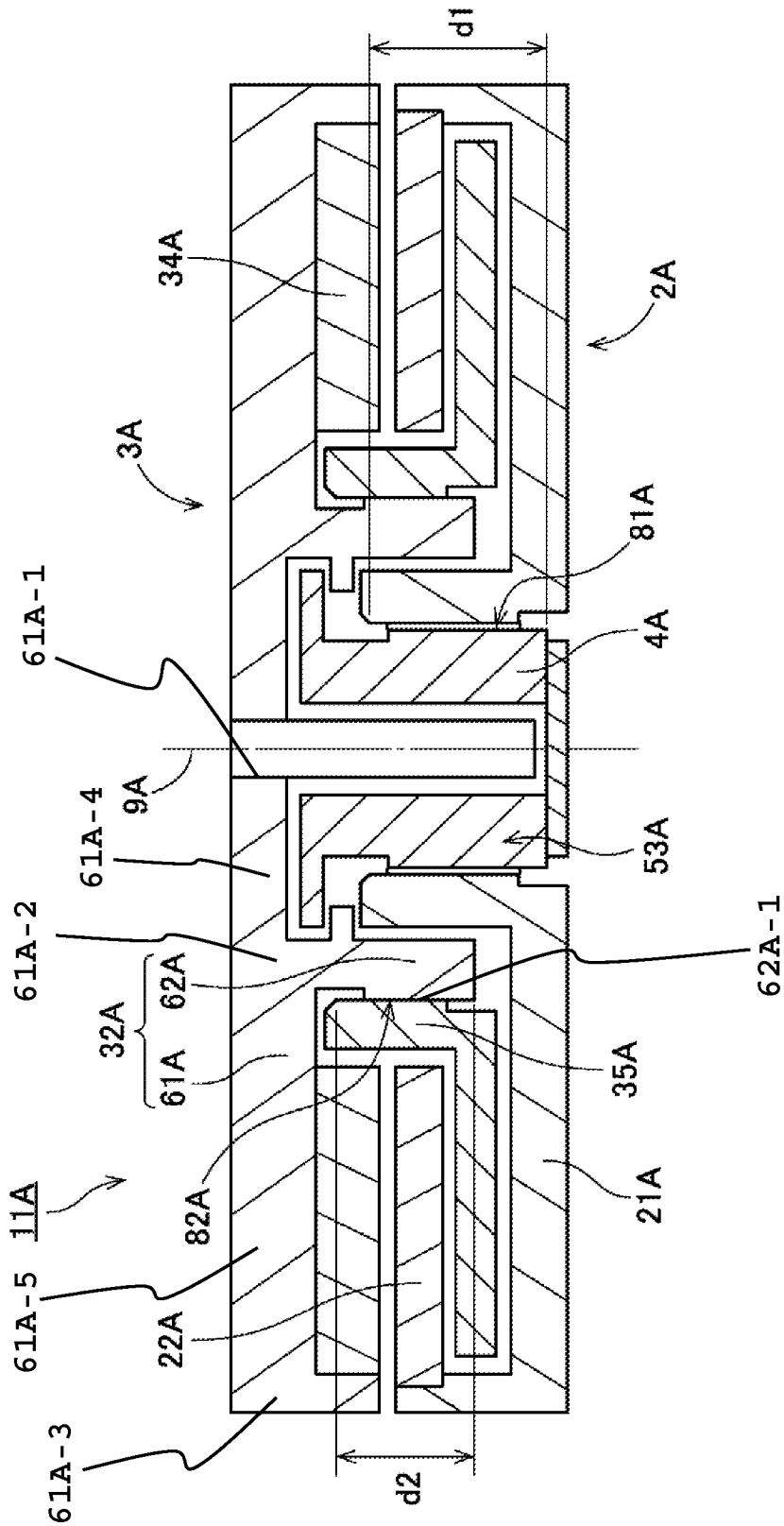
FIG. 1 is a vertical section view showing a brushless motor according to a first preferred embodiment.

FIG. 1 is a vertical section view showing a brushless motor 11A according to a first preferred embodiment. As shown in FIG. 1, the brushless motor 11A includes a stationary unit 2A and a rotary unit 3A. The rotary unit 3A is rotatably supported with respect to the stationary unit 2A through a bearing mechanism 4A.

The stationary unit 2A includes a base member 21A and an armature 22A. The armature 22A extends in a flat shape in the direction orthogonal to a center axis 9A. The armature 22A is supported on the base member 21A. The base member 21A includes a base through-hole 53A extending in an up-down direction. The inner circumferential surface of the base member 21A defining the base through-hole 53A makes contact with the outer circumferential surface of the bearing mechanism 4A or remains radially opposed to the outer circumferential surface of the bearing mechanism 4A across an adhesive agent in a first fixing portion 81A. In other words, the inner circumferential surface of the base member 21A may be opposed to the outer circumferential surface of the bearing mechanism 4A in a contact state or may be opposed to the outer circumferential surface of the bearing mechanism 4A in a non-contact state with a radial gap left therebetween.

The rotary unit 3A includes a hub 32A, a magnet 34A and a rotor yoke 35A. The hub 32A includes a top plate portion 61A made of a magnetic material and a hub protrusion portion 62A made of a magnetic material. The hub protrusion portion 62A extends downward from the top plate portion 61A. The magnet 34A is fixed to the hub 32A and is opposed to the upper surface of the armature 22A. Alternatively, the magnet 34A may be fixed to the rotor yoke 35A and may be opposed to the lower surface of the armature 22A. The rotor yoke 35A is a magnetic body fixed to the hub protrusion portion 62A. The rotor yoke 35A is positioned below the armature 22A. The rotor yoke 35A makes contact with the hub protrusion portion 62A or remains radially opposed to the hub protrusion portion 62A across an adhesive agent in a second fixing portion 82A. In other words, the rotor yoke 35A may be opposed to the hub protrusion portion 62A in a contact state or may be opposed to the hub protrusion portion 62A in a non-contact state with a radial gap left therebetween.

In this regard, an axial length between a lower end of a constant diameter surface of the bearing mechanism 4A extending along the first fixing portion 81A or further extending downward from the first fixing portion 81A and an upper end of a constant diameter surface of the base member 21A extending along the first fixing portion 81A or further extending upward from the first fixing portion 81A is assumed to be d1. An axial length between a lower end of a constant diameter surface of the hub protrusion portion 62A extending along the second fixing portion 82A or further extending downward from the second fixing portion 82A and an upper end of a constant diameter surface of the rotor yoke 35A extending along the second fixing portion 82A or further extending upward from the second fixing portion 82A is assumed to be d2. In the brushless motor 11A, as shown in FIG. 1, d1 and d2 are set to satisfy a relationship of d1>d2. The term "constant diameter surface" includes a substantially constant diameter surface.

When manufacturing the brushless motor 11A, a first unit including the base member 21A, the armature 22A and the rotor yoke 35A is prepared first. Furthermore a second unit including the bearing mechanism 4A, the hub 32A and the magnet 34A is prepared. Then, the first unit and the second unit are combined together.

In order to combine the first unit and the second unit together, the bearing mechanism 4A is first inserted into the base member 21A. In other words, the inner circumferential surface of the base member 21A is brought into contact with the outer circumferential surface of the bearing mechanism 4A or is caused to radially oppose the outer circumferential surface of the bearing mechanism 4A across an adhesive agent. As a consequence, the respective members are substantially coaxially located in position on the basis of the first fixing portion 81A. Thereafter, the hub protrusion portion 62A is brought into contact with the rotor yoke 35A or is caused to radially oppose the rotor yoke 35A across an adhesive agent. As a result, the rotor yoke 35A and the hub protrusion portion 62A are accurately fixed to each other in the second fixing portion 82A. As illustrated in FIG. 1, the top plate portion 61A is radially extended from an inner peripheral end 61A-1 through a middle portion 61A-2 to reach an outer peripheral end 61A-3. The top plate portion 61A has a first part 61A-4 and a second part 61A-5. The rotor yoke is fixed to a radially outer side 62A-1 of the hub protrusion portion.

The brushless motor 11A may be modified to satisfy a relationship of d1<d2. in this case, when combining the first unit and the second unit together, the hub protrusion portion is first inserted into the rotor yoke. In other words, the rotor yoke is brought into contact with the hub protrusion portion or is caused to radially oppose the hub protrusion portion across an adhesive agent. As a consequence, the respective members are substantially coaxially located in position on the basis of the second fixing portion. Thereafter, the inner circumferential surface of the base member is brought into contact with the outer circumferential surface of the bearing mechanism or is caused to radially oppose the outer circumferential surface of the bearing mechanism across an adhesive agent. As a result, the base member and the bearing mechanism are accurately fixed to each other in the first fixing portion.

Figure 2:
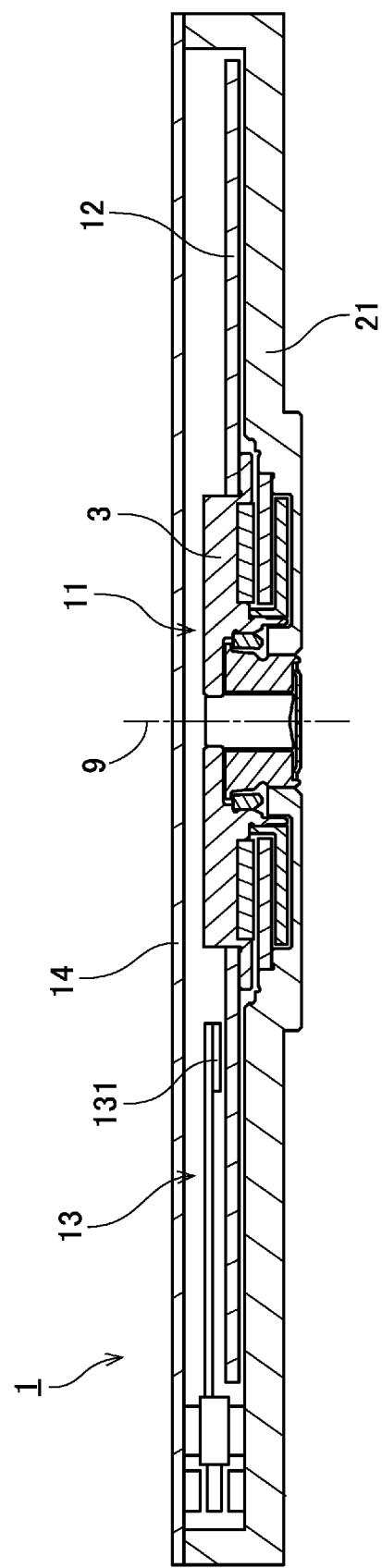
FIG. 2 is a vertical section view showing a disk drive apparatus according to a second preferred embodiment.

FIG. 2 is a vertical section view showing a disk drive apparatus 1 according to a second preferred embodiment. The disk drive apparatus 1 is an apparatus for performing information reading and writing tasks with respect to a magnetic disk 12 while rotating the magnetic disk 12. As shown in FIG. 2, the disk drive apparatus 1 includes a brushless motor 11, a magnetic disk 12, an access unit 13 and a cover 14.

The brushless motor 11 supports the magnetic disk 12 and rotates the magnetic disk 12 about the center axis 9. The brushless motor 11 includes a base member 21 extending radially at the lower side of the magnetic disk 12. The rotary unit 3 of the brushless motor 11, the magnetic disk 12 and the access unit 13 are accommodated within a housing made up of the base member 21 and the cover 14. The access unit 13 displaces a head 131 along the recording surface of the magnetic disk 12 and performs information reading and writing tasks with respect to the magnetic disk 12. The base member 21 may be formed of a single member or an assembly including a plurality of members.

The disk drive apparatus may include two or more magnetic disks 12. The access unit 13 may perform only one of information reading and writing tasks with respect to the magnetic disk 12.

Figure 3:
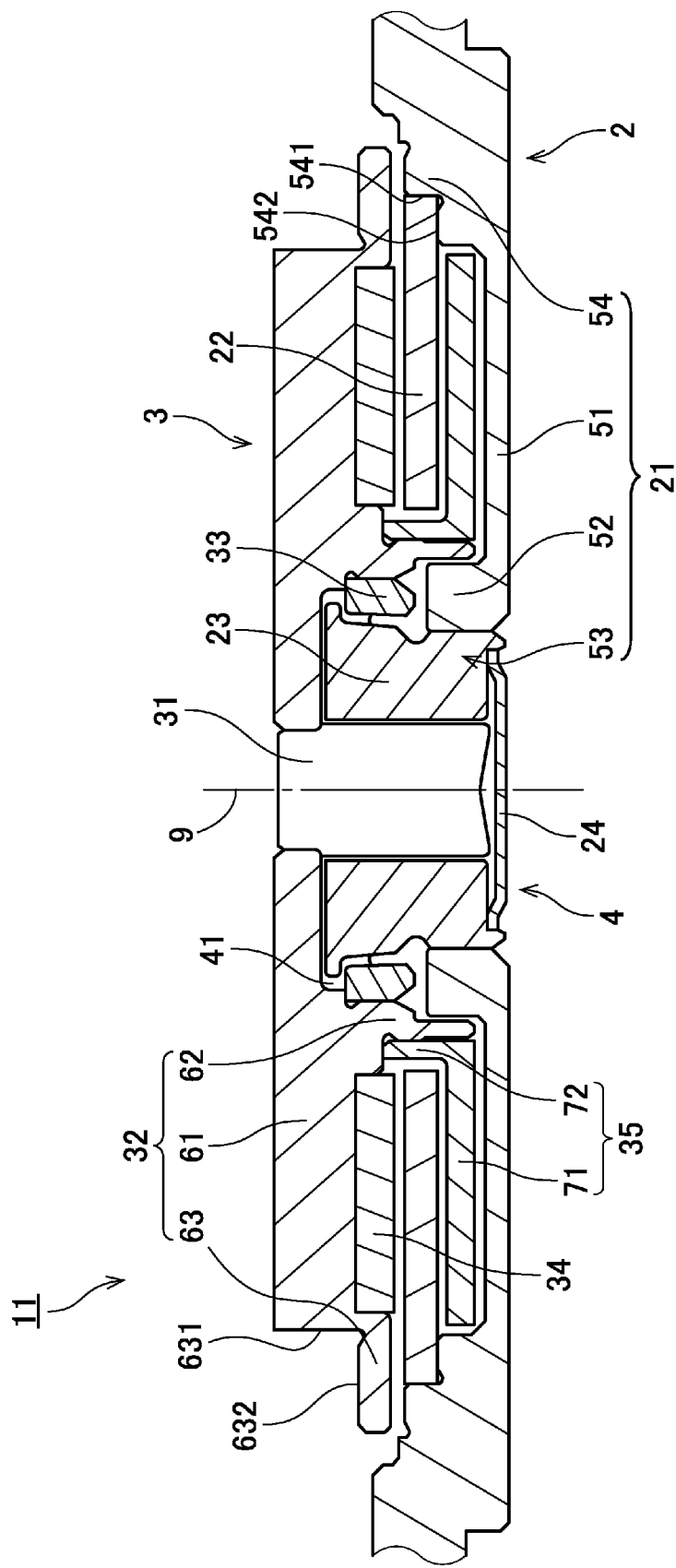
FIG. 3 is a vertical section view showing a brushless motor according to the second preferred embodiment.

Next, description will be made on the configuration of the brushless motor 11. FIG. 3 is a vertical section view of the brushless motor 11. As shown in FIG. 3, the brushless motor 11 includes a stationary unit 2 and a rotary unit 3. The stationary unit 2 is kept stopped with respect to the base member 21 and the cover 14. The rotary unit 3 is rotatably supported with respect to the stationary unit 2 through a bearing mechanism 4.

The stationary unit 2 of the present embodiment includes a base member 21, an armature 22, a sleeve 23 and a cap 24.

The base member 21 supports the armature 22 and the sleeve 23. The base member 21 can be formed by casting metal, e.g., aluminum. As shown in FIG. 3, the base member includes a bottom plate portion 51, a base protrusion portion 52, a base through-hole 53 and an armature holding portion 54.

The bottom plate portion 51 lies below the armature 22 and extends in the direction orthogonal to the center axis 9. The base protrusion portion 52 extends upward from the inner periphery of the bottom plate portion 51 in a substantially cylindrical shape. The base protrusion portion 52 is positioned radially inward of a hub protrusion portion 62 to be described later. The base through-hole 53 lies radially inward of the base protrusion portion 52 and extends in the up-down direction.

The armature holding portion 54 lies radially outward of a rotor yoke 35 to be described later and protrudes upward from the bottom plate portion 51. The armature holding portion 54 includes a wall portion 541 and an annular surface 542. The wall portion 541 is radially opposed to the outer edge portion of the armature 22. The annular surface 542 extends radially inward from the lower end of the wall portion 541. The armature 22 is arranged radially inward of the wall portion 541 and is supported on the annular surface 542. The outer edge portion may oppose the wall portion 541 in a contact state or may oppose the wall portion 541 with a radial gap left therebetween.

The armature 22 is a flat circuit board extending in the direction orthogonal to the center axis 9. The armature 22 is arranged radially outward of the bearing mechanism 4, below the magnet 34 to be described later and above the disc portion 71 of the rotor yoke 35 to be described later. The radial outer edge portion of the armature 22 is fixed to the armature holding portion 54 by, e.g., an adhesive agent. The armature 22 includes a plurality of electrically conductive coil patterns arranged along the circumferential direction. Preferably, each of the coil patterns is spirally arranged about a coil axis extending in the axial direction.

The sleeve 23 extends axially in a substantially cylindrical shape around a shaft 31 to be described later. The lower portion of the sleeve 23 is inserted into the base through-hole 53 and is fixed to the inner circumferential surface of the base protrusion portion 52. The inner circumferential surface of the sleeve 23 is radially opposed to the outer circumferential surface of the shaft 31. The lower opening of the sleeve 23 is closed by the cap 24.

The rotary unit 3 of the present embodiment includes a shaft 31, a hub 32, a ring-shaped member 33, a plurality of magnets 34 and a rotor yoke 35.

The shaft 31 is a member extending in the axial direction. The shaft 31 is made of metal, e.g., stainless steel. The shaft 31 is supported on the sleeve 23 and the cap 24 through a lubricant 41 and is rotated about the center axis 9. The upper end portion of the shaft 31 protrudes upward beyond the upper surface of the sleeve 23.

The hub 32 includes a top plate portion 61, a hub protrusion portion 62 and a disk support portion 63. In the present embodiment, the hub 32 as a whole is made of a magnetic material. The top plate portion 61 lies above the armature 22 and extends radially and circumferentially. The radial inner edge portion of the top plate portion 61 is fixed to the upper end portion of the shaft 31. The hub protrusion portion 62 extends downward from the top plate portion 61 in a substantially cylindrical shape. The shaft 31 and the hub 32 may be a single member. The hub 32 may be formed of a single member or an assembly including a plurality of members.

The disk support portion 63 is arranged radially outward of the top plate portion 61 to support the magnetic disk 12. The disk support portion 63 includes a substantially cylindrical first support surface 631 and a second support surface 632 extending radially outward from the lower end of the first support surface 631. The inner circumferential portion of the magnetic disk 12 makes contact with the first support surface 631. Thus the magnetic disk 12 is radially located in position. The lower surface of the magnetic disk 12 makes contact with the second support surface 632. Accordingly, the magnetic disk 12 is axially located in position.

The ring-shaped member 33 is a circular ring-shaped member positioned radially inward of the hub protrusion portion 62. The upper surface of the ring-shaped member 33 makes contact with the lower surface of the top plate portion 61. The radial outer surface of the ring-shaped member 33 is fixed to the inner circumferential surface of the hub protrusion portion 62 by press fit and/or by a fixing means such as an adhesive agent or the like.

A lubricant 41 exists between the combination of the sleeve 23 and the cap 24 and the combination of the shaft 31, the hub 32 and the ring-shaped member 33. The liquid level of the lubricant 41 is positioned between the outer circumferential surface of the sleeve 23 and the inner circumferential surface of the ring-shaped member 33. The shaft 31, the hub 32 and the ring-shaped member 33 are rotatably supported with respect to the sleeve 23 and the cap 24 through the lubricant 41. In the present embodiment, the bearing mechanism 4 is made up of: the sleeve 23 and the cap 24 which belong to the stationary unit 2; the shaft 31, the hub 32 and the ring-shaped member 33 which belong to the rotary unit 3; and the lubricant 41 existing therebetween. For example, polyol ester-based oil or diester-based lubricating liquid is used as the lubricant 41.

A radial dynamic pressure groove array is provided on at least one of the inner circumferential surface of the sleeve 23 and the outer circumferential surface of the shaft 31. The radial dynamic pressure groove array is formed into, e.g., a herringbone shape. Upon driving the brushless motor 11, the radial dynamic pressure groove array induces a radial dynamic pressure in the lubricant 41 existing between the sleeve 23 and the shaft 31. The shaft 31 is radially supported with respect to the sleeve 23 by the dynamic pressure thus induced.

A thrust dynamic pressure groove array is provided on at least one of the upper surface of the sleeve 23 and the lower surface of the top plate portion 61. The thrust dynamic pressure groove array is formed into, e.g., a herringbone shape. Upon driving the brushless motor 11, the thrust dynamic pressure groove array induces an axial dynamic pressure in the lubricant 41 existing between the sleeve 23 and the hub 32. The hub 32 is axially supported with respect to the sleeve 23 by the axial dynamic pressure thus induced. The thrust dynamic pressure groove array may be, e.g., a spiral groove array for increasing a pressure at the radial inner side.

The magnets 34 are fixed to the lower surface of the top plate portion 61 of the hub 32 by means of, e.g., an adhesive agent. The magnets 34 are positioned above the armature 22. The lower surface of each of the magnets 34 is a magnetic pole surface axially opposed to each of the coil patterns provided on the upper surface of the armature 22. The magnets 34 are arranged along the circumferential direction in such a way that the magnetic pole surfaces of N-pole and the magnetic pole surfaces of S-pole can be alternately arranged side by side. A single annular magnet alternately magnetized with N-poles and S-poles along the circumferential direction may be used in place of the magnets 34.

The rotor yoke 35 is a magnetic body rotating together with the hub 32 and the magnets 34. The rotor yoke 35 of the present embodiment includes a disc portion 71 and a yoke protrusion portion 72. The disc portion 71 is positioned below the armature 22 and above the bottom plate portion 51 of the base member 21 so as to extend in a circular ring shape. The yoke protrusion portion 72 lies radially inward of the armature 22 and extends upward from the disc portion 71 in a substantially cylindrical shape. The yoke protrusion portion 72 is fixed to the hub protrusion portion 62.

In the brushless motor 11 described above, magnetic fluxes axially penetrating the armature 22 are generated if a drive current is supplied to the coil patterns of the armature 22. Also formed is a magnetic circuit extending through the armature 22, the magnets 34, the hub 32 and the rotor yoke 35. Circumferential torque is generated under the action of the magnetic fluxes. As a result, the rotary unit 3 is rotated about the center axis 9 with respect to the stationary unit 2 The magnetic disk 12 supported on the hub 32 is rotated about the center axis 9 together with the rotary unit 3.

Next, description will be made on a structure for fixing the base member 21 and the bearing mechanism 4 and a structure for fixing the hub 32 and the rotor yoke 35.

Figure 4:
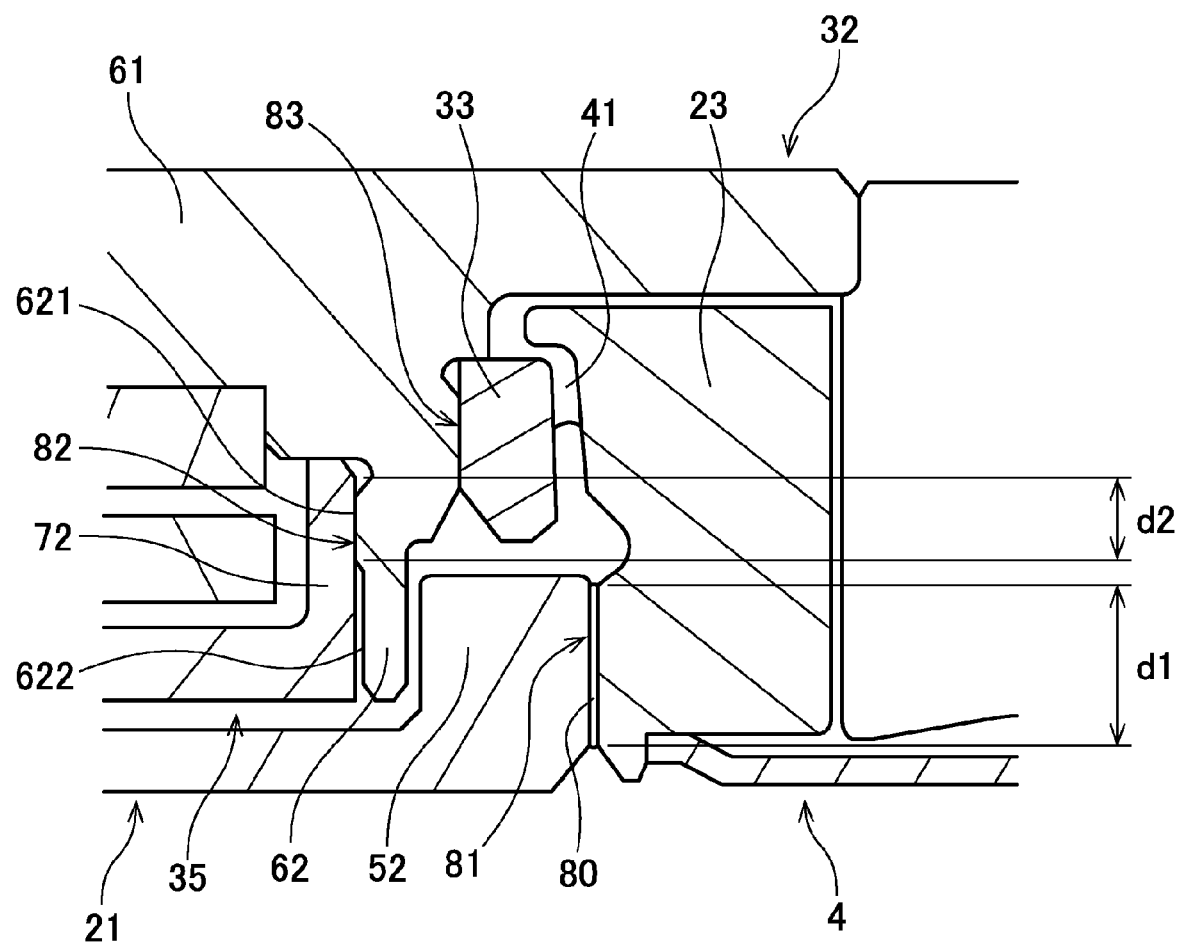
FIG. 4 a partial vertical section view of the brushless motor according to the second preferred embodiment.

FIG. 4 is a partial vertical section view of the brushless motor 11. As shown in FIG. 4, the lower portion of the sleeve 23 is arranged radially inward of the base protrusion portion 52. The inner circumferential surface of the base protrusion portion 52 and the outer circumferential surface of the sleeve 23 are fixed to each other by an adhesive agent 80. In the following description, the portion where the inner circumferential surface of the base member 21 and the outer circumferential surface of the bearing mechanism 4 are fixed to each other will be referred to as first fixing portion 81. In the first fixing portion 81, the inner circumferential surface of the base protrusion portion 52 defining the base through-hole 53 is radially opposed to the outer circumferential surface of the sleeve 23, i.e., the outer circumferential surface of the bearing mechanism 4, with a gap left therebetween. An adhesive agent exists in the gap.

In the brushless motor 11 of the present embodiment, the yoke protrusion portion 72 is positioned radially outward of the hub protrusion portion 62. The hub protrusion portion 62 is press-fitted to the yoke protrusion portion 72. In the following description, the portion where the hub protrusion portion 62 and the rotor yoke 35 are fixed to each other will be referred to as second fixing portion 82. In the second fixing portion 82, the outer circumferential surface of the hub protrusion portion 62 makes contact with the inner circumferential surface of the yoke protrusion portion 72.

In the present embodiment, the outer circumferential surface of the hub protrusion portion 62 includes a hub-side contact surface 621 and a hub-side opposing surface 622 positioned below the hub-side contact surface 621. The hub-side contact surface 621 protrudes radially outward of the hub-side opposing surface 622. In the present embodiment, therefore, only the hub-side contact surface 621 makes contact with the inner circumferential surface of the yoke protrusion portion 72. The hub-side opposing surface 622 is radially opposed to the inner circumferential surface of the yoke protrusion portion 72 with a gap left therebetween.

In this regard, an axial length between a lower end of a constant diameter surface of the sleeve 23 extending along the first fixing portion 81 or further extending downward from the first fixing portion 81 and an upper end of a constant diameter surface of the base protrusion portion 52 extending along the first fixing portion 81 or further extending upward from the first fixing portion 81 is assumed to be d1. In the example shown in FIG. 4, the constant diameter surface of the sleeve 23 does not extend below the first fixing portion 81. Moreover, the constant diameter surface of the base protrusion portion 52 does not extend above the first fixing portion 81. Consequently, the axial length of the first fixing portion 81 is equal to d1.

An axial length between a lower end of a constant diameter surface of the hub protrusion portion 62 extending along the second fixing portion 82 or further extending downward from the second fixing portion 82 and an upper end of a constant diameter surface of the yoke protrusion portion 72 extending along the second fixing portion 82 or further extending upward from the second fixing portion 82 is assumed to be d2.

In the example shown in FIG. 4, the constant diameter surface of hub protrusion portion 62 does not extend below the second fixing portion 82. Consequently, the axial length between the lower end of the second fixing portion 82 and the upper end of a constant diameter surface of the yoke protrusion portion 72 extending along the second fixing portion 82 is equal to d2.

In the brushless motor 11, as shown in FIG. 4, d1 and d2 are set to satisfy a relationship of d1>d2. For that reason, when manufacturing the brushless motor 11, the bonding of the sleeve 23 and the base protrusion portion 52 in the first fixing portion 81 is started prior to the hub protrusion portion 62 coming into contact with the yoke protrusion portion 72 in the second fixing portion 82. Thus, the respective members are substantially coaxially located in position on the basis of the first fixing portion 81. As a result, the rotor yoke 35 and the hub 32 are accurately fixed to each other in the second fixing portion 82. The term "constant diameter surface" includes a substantially constant diameter surface.

Particularly, in the present embodiment, the rotor yoke 35 is provided with an axially-extending cylindrical yoke protrusion portion 72. The hub protrusion portion 62 is press-fitted to the yoke protrusion portion 72. This makes it possible to lengthen the second fixing portion 82 in the axial direction. Accordingly, it is possible to strongly fix the hub 32 and the rotor yoke 35.

In the present embodiment, the yoke protrusion portion 72 is positioned radially outward of the hub protrusion portion 62. In other words, the hub protrusion portion 62 is arranged between the yoke protrusion portion 72 and the base protrusion portion 52. Thus, the yoke protrusion portion 72 belonging to the rotary unit 3 is restrained from making contact with the base protrusion portion 52 belonging to the stationary unit 2.

In the present embodiment, the hub protrusion portion 62 includes a hub-side opposing surface 622 positioned below a hub-side contact surface 621. The hub-side opposing surface 622 is a little smaller in diameter than the hub-side contact surface 621. For that reason, in the manufacturing process to be described later, the hub-side contact surface 621 can be press-fitted to the inner circumferential surface of the yoke protrusion portion 72 after the hub-side opposing surface 622 is inserted into the radial inner side of the yoke protrusion portion 72. This makes it possible to restrain the hub 32 from being inclined with respect to the rotor yoke 35 in the press-fitting process. Accordingly, it becomes possible to accurately fix the hub 32 with respect to the rotor yoke 35.

The outer circumferential surface of the ring-shaped member 33 makes contact with the inner circumferential surface of the hub protrusion portion 62 or stays radially opposed to the inner circumferential surface of the hub protrusion portion 62 across an adhesive agent. In the present embodiment, the lower end of a third fixing portion 83 where the ring-shaped member 33 and the hub protrusion portion 62 are fixed to each other is positioned above the upper end of the second fixing portion 82. In other words, the second fixing portion 82 and the third fixing portion 83 do not radially overlap with each other. For that reason, the press-fitting load applied to the second fixing portion 82 is hard to be transferred to the third fixing portion 83. This helps restrain the ring-shaped member 33 from being displaced radially inward. As a result, it is possible to accurately set the radial gap between the sleeve 23 and the ring-shaped member 33 in a position near the liquid level of the lubricant 41.

Figure 5:
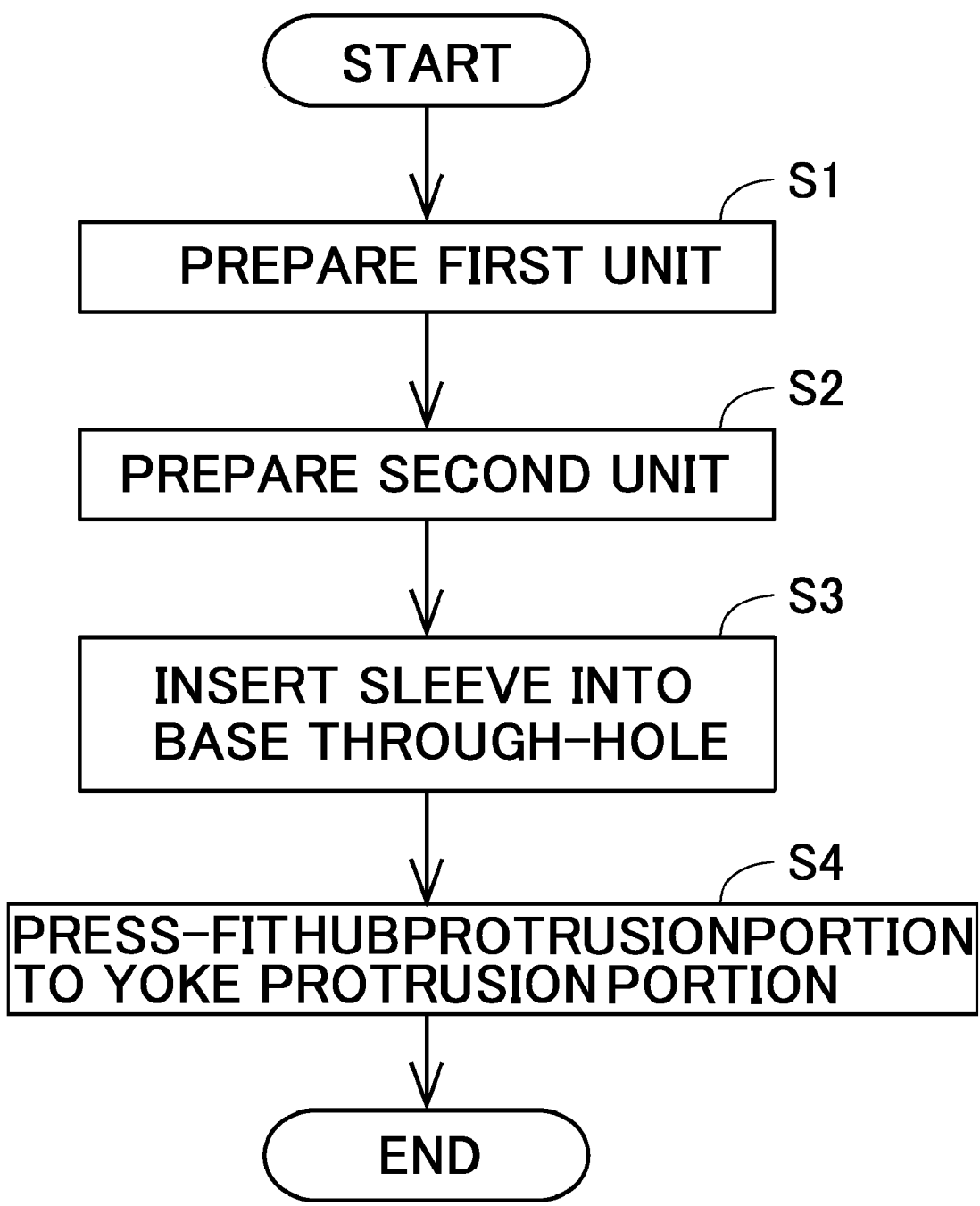
FIG. 5 is a flowchart illustrating some steps for manufacturing the brushless motor according to the second preferred embodiment.
Figure 6:
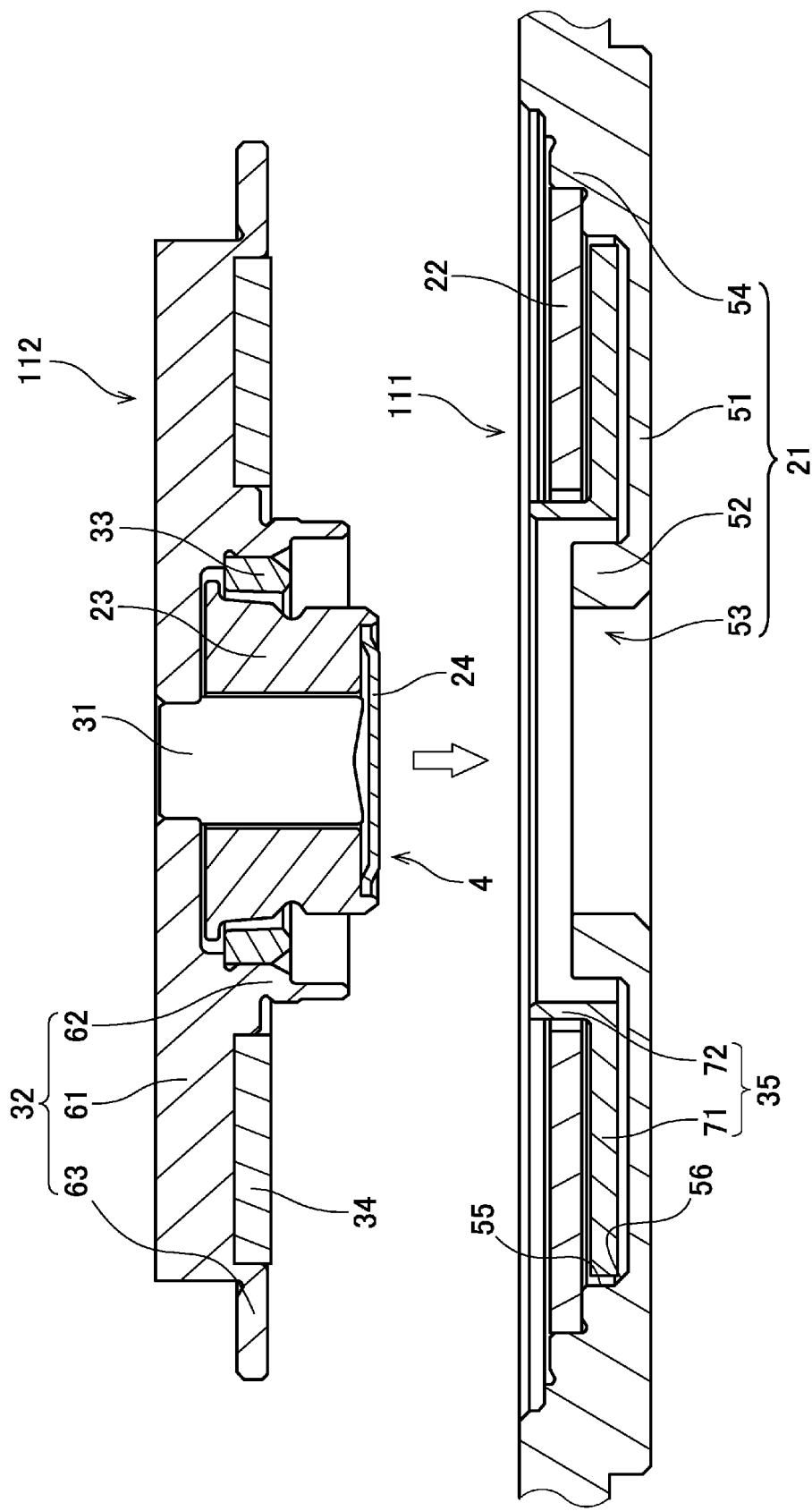
FIG. 6 is a vertical section view showing the brushless motor according to the second preferred embodiment, which is under a manufacturing process.
Figure 7:
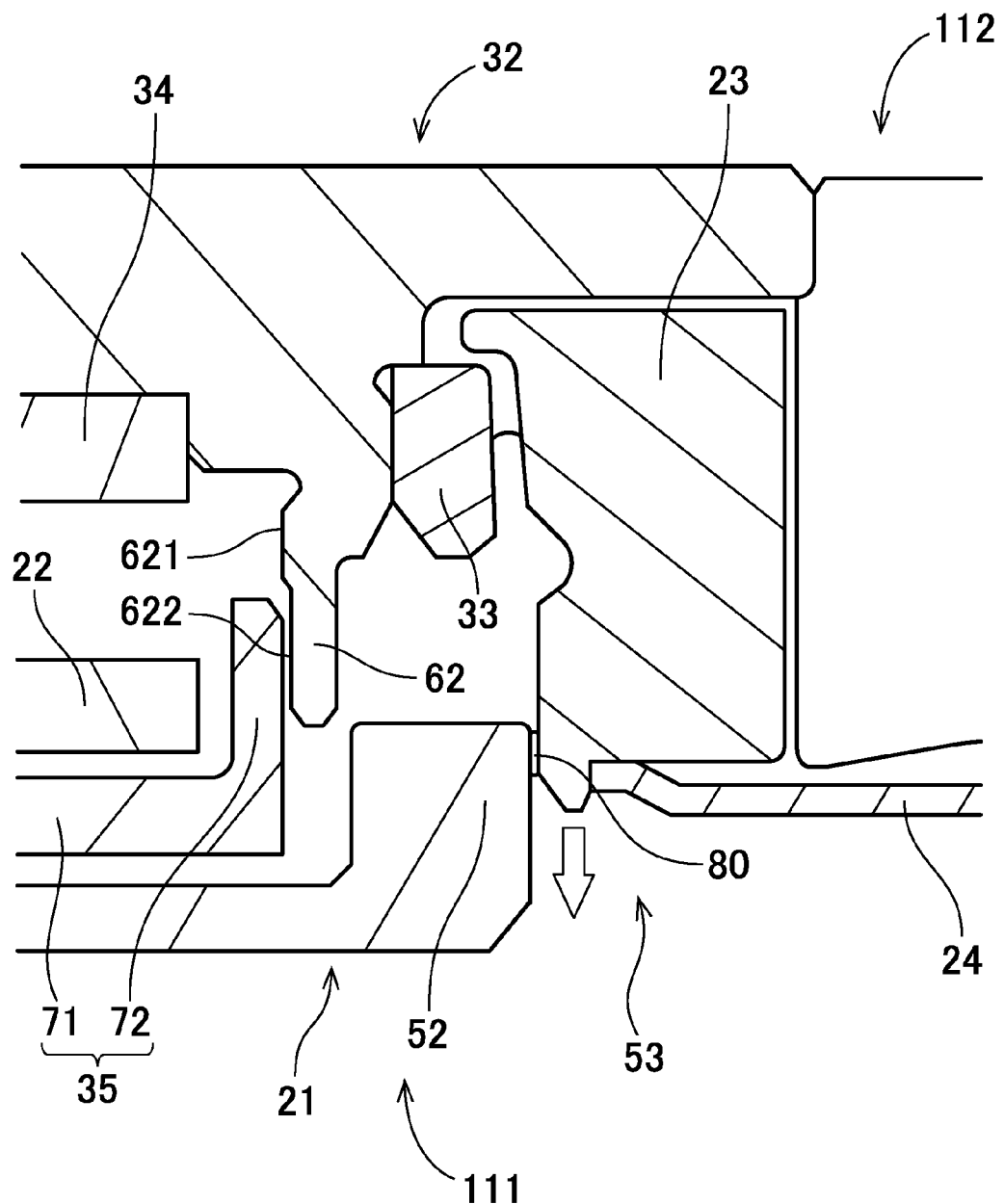
FIG. 7 is a vertical section view showing the brushless motor according to the second preferred embodiment, which is under a manufacturing process.
Figure 8:
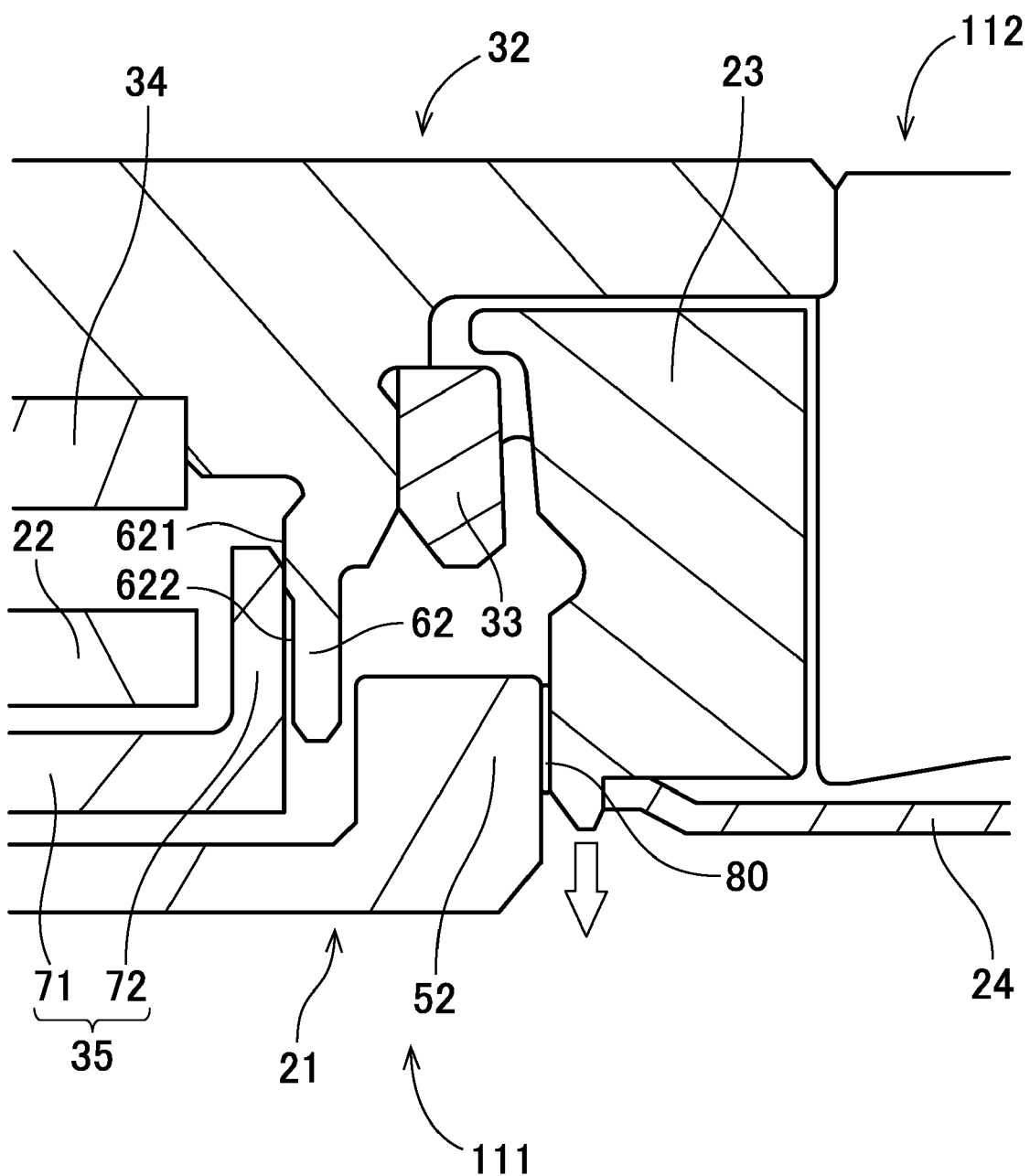
FIG. 8 is a vertical section view showing the brushless motor according to the second preferred embodiment, which is under a manufacturing process.

FIG. 5 is a flowchart illustrating some steps for manufacturing the brushless motor 11 according to the second preferred embodiment. FIGS. 6 through 8 are vertical section views showing the brushless motor 11 which is under a manufacturing process. A manufacturing sequence of the brushless motor 11 will now be described with reference to FIGS. 5 through 8.

When manufacturing the brushless motor 11, a first unit 111 including the base member 21, the armature 22 and the rotor yoke 35 is prepared first (step S1). As shown in FIG. 6, the base member 21 includes a tubular surface 55 and a slant surface 56. The tubular surface 55 is radially opposed to the outer circumferential portion of the rotor yoke 35. The slant surface 56 obliquely extends such that the diameter of the slant surface 56 grows smaller as the slant surface 56 extends downward from the lower end portion of the tubular surface 55. In the first unit 111, the rotor yoke 35 is arranged inside the tubular surface 55. The lower end portion of the outer circumferential surface of the rotor yoke 35 is arranged on the slant surface 56. As a consequence, the rotor yoke 35 is arranged in a substantially coaxial relationship with the center axis 9.

Next, a second unit 112 including the sleeve 23, the shaft 31, the hub 32, the ring-shaped member 33 and the magnets 34 is prepared (step S2). Step S2 may be performed prior to step S1 or may be performed simultaneously with step S1. Thereafter, the first unit 111 and the second unit 112 are combined together (steps S3 and S4).

In order to combine the first unit 111 and the second unit 112 together, an adhesive agent 80 is first applied on the upper end portion of the inner circumferential surface of the base protrusion portion 52 or on the lower end portion of the outer circumferential surface of the sleeve 23. Then, as shown in FIG. 7, the sleeve 23 is inserted into the base through-hole 53 (step S3). The inner circumferential surface of the base protrusion portion 52 is radially opposed to the outer circumferential surface of the sleeve 23 across the adhesive agent 80. Thus, the respective members are substantially coaxially located in position on the basis of the inner circumferential surface of the base protrusion portion 52 and the outer circumferential surface of the sleeve 23.

At the time point shown in FIG. 7, the lower end portion of the hub protrusion portion 62 stays inserted into the radial inner side of the yoke protrusion portion 72. Since the diameter of the hub-side opposing surface 622 is smaller than the inner diameter of the yoke protrusion portion 72, the hub protrusion portion 62 does not make contact with the yoke protrusion portion 72.

Thereafter, the second unit 112 is further moved down with respect to the first unit 111. Consequently, as shown in FIG. 8, the hub protrusion portion 62 is press-fitted to the yoke protrusion portion 72 (step S4). In other words, the outer circumferential surface of the yoke protrusion portion 72 comes into contact with the hub-side contact surface 621 of the hub protrusion portion 62. In the present embodiment, as stated above, the sleeve 23 is first inserted into the base protrusion portion 52. Thereafter, the yoke protrusion portion 72 and the hub protrusion portion 62 are brought into contact with each other. Accordingly, the hub 32 is accurately fixed with respect to the rotor yoke 35.

Figure 9:
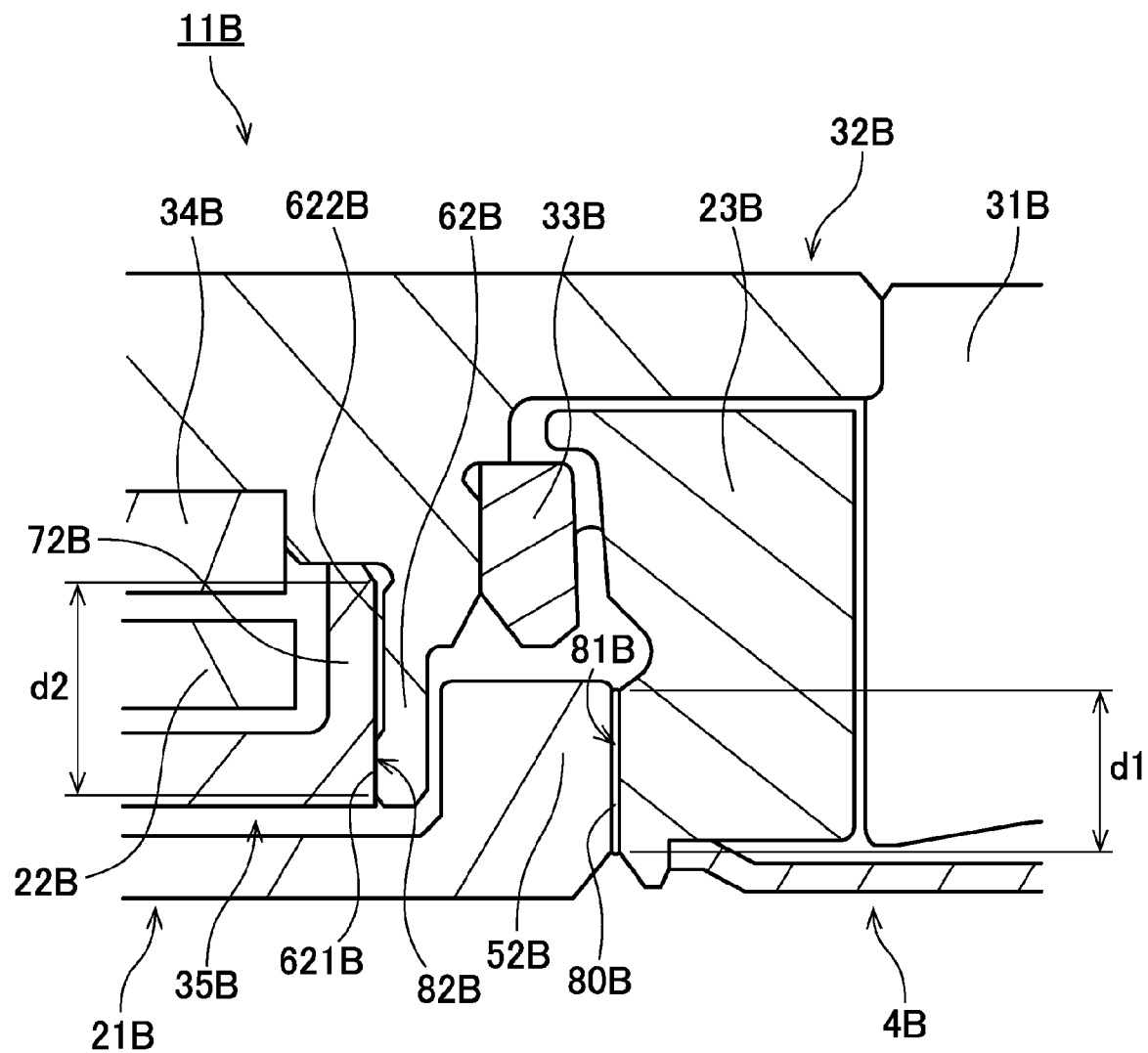
FIG. 9 is a partial vertical section view showing a brushless motor according to a third preferred embodiment.

FIG. 9 is a partial vertical section view showing a brushless motor 11B according to a third preferred embodiment. Description will now be made on the brushless motor 11B according to the third preferred embodiment, with an emphasis placed on the points differing from the second embodiment.

In the brushless motor 11B shown in FIG. 9, the hub-side contact surface 621B of the hub protrusion portion 62B is positioned below in the second embodiment. The hub-side opposing surface 622B is positioned above the hub-side contact surface 621B. If d1 and d2 are defined as in the second embodiment, a relationship of d1<d2 is satisfied in the brushless motor 11B.

For that reason, when manufacturing the brushless motor 11B, the contact of the hub protrusion portion 62B with the yoke protrusion portion 72B in the second fixing portion 82B is started prior to the sleeve 23B being bonded to the base protrusion portion 52B in the first fixing portion 81B. Thus, the respective members are substantially coaxially located in position on the basis of the second fixing portion 82B. As a result, the base member 21B and the sleeve 23B are accurately fixed to each other in the first fixing portion 81B.

Figure 10:
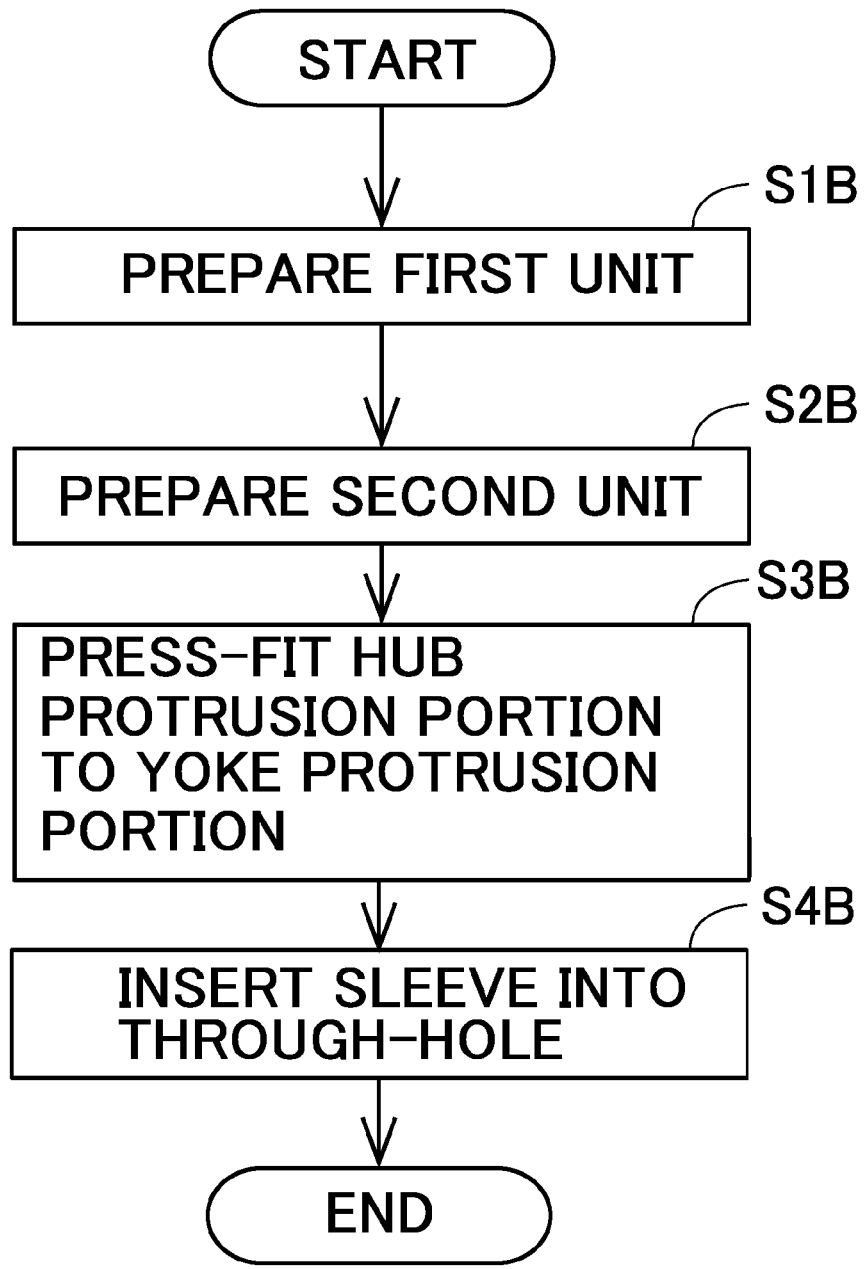
FIG. 10 is a flowchart illustrating some steps for manufacturing the brushless motor according to the third preferred embodiment.
Figure 11:
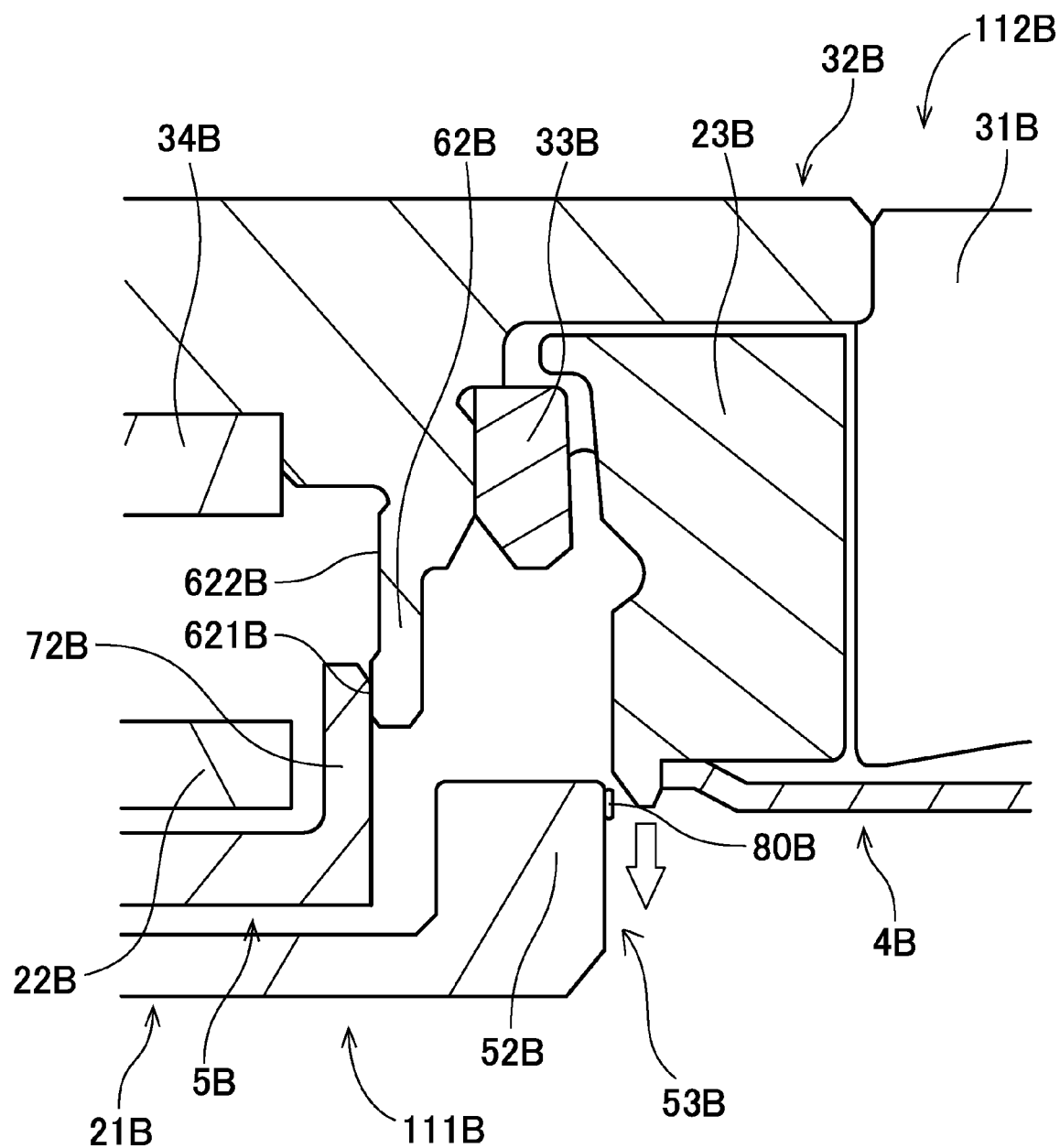
FIG. 11 is a partial vertical section view showing the brushless motor according to the third preferred embodiment, which is under a manufacturing process.

FIG. 10 is a flowchart illustrating some steps for manufacturing the brushless motor 11B. FIG. 11 is a partial vertical section view showing the brushless motor 11B which is under a manufacturing process. A manufacturing sequence of the brushless motor 11B will now be described with reference to FIGS. 10 and 11.

When manufacturing the brushless motor 11B, just like the second preferred embodiment, a first unit 111B including the base member 21B, the armature 22B and the rotor yoke 35B and a second unit 112B including the sleeve 23B, the shaft 31B, the hub 32B, the ring-shaped member 33B and the magnets 34B are prepared (steps S1B and S2B). Thereafter, the first unit 111B and the second unit 112B are combined together (steps S3B and S4B).

In order to combine the first unit 111B and the second unit 112B together, an adhesive agent SOB is first applied on the upper end portion of the inner circumferential surface of the base protrusion portion 52B or on the lower end portion of the outer circumferential surface of the sleeve 23B. Then, as shown in FIG. 11, the hub protrusion portion 62B is press-fitted to the yoke protrusion portion 72B (step S3B). In other words, the outer circumferential surface of the yoke protrusion portion 72B is brought into contact with the hub-side contact surface 621B of the hub protrusion portion 62B. As a consequence, the respective members are substantially coaxially located in position on the basis of the hub-side contact surface 621B and the inner circumferential surface of the yoke protrusion portion 72B.

Thereafter, the second unit 112B is further moved down with respect to the first unit 111B. As a result, the sleeve 23 is inserted into the base through-hole 53B (step S4B). Thus, the inner circumferential surface of the base protrusion portion 52B is radially opposed to the outer circumferential surface of the sleeve 23B across the adhesive agent 80B. In the present embodiment, as stated above, the hub protrusion portion 62B is first press-fitted to the yoke protrusion portion 72B. Thereafter, the sleeve 23 B is inserted into the base protrusion portion 52 B. Accordingly, the sleeve 23B is accurately fixed with respect to the base member 21B.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

Figure 12:
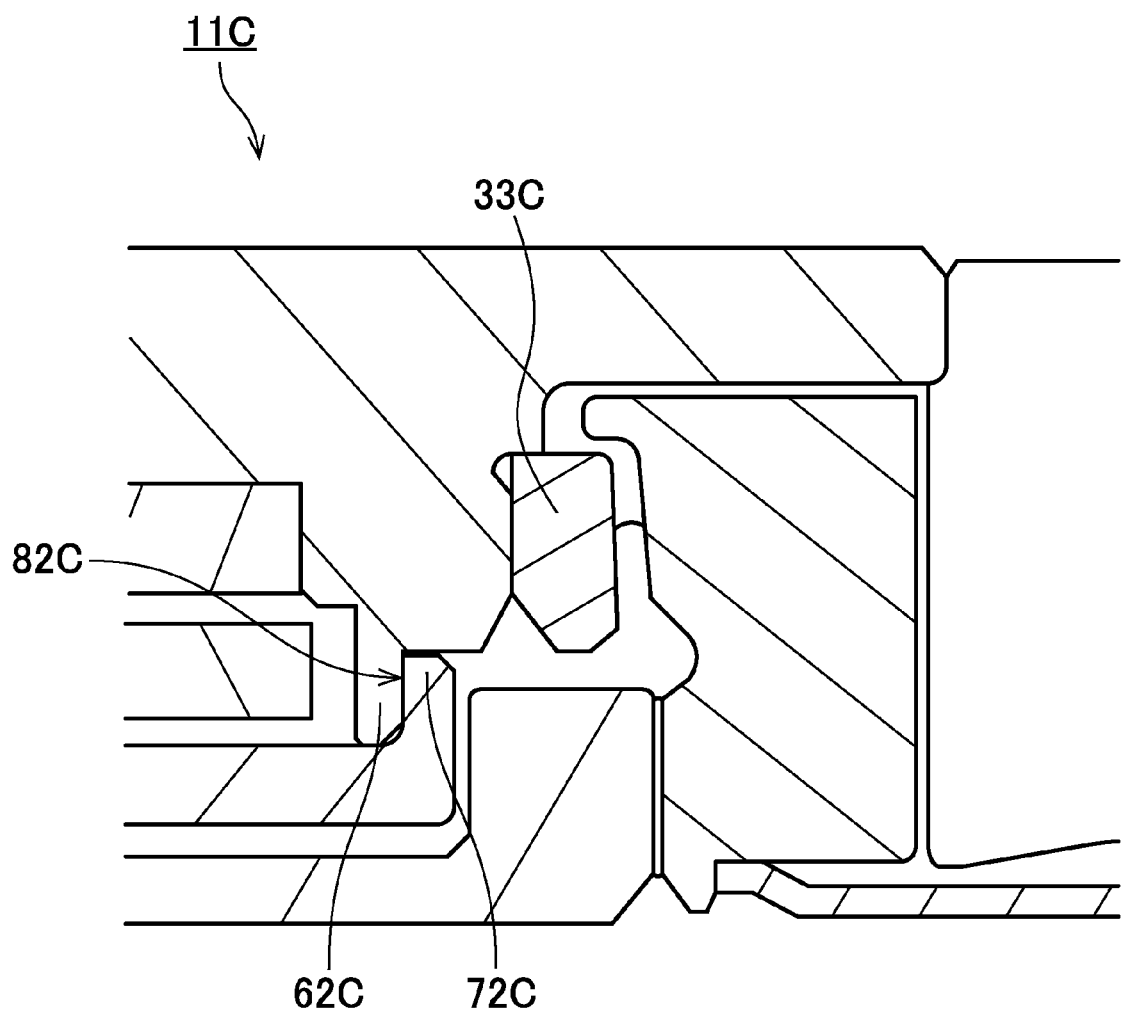
FIG. 12 is a partial vertical section view of a brushless motor according to one modified example.

FIG. 12 is a partial vertical section view of a brushless motor 11C according to one modified example. In the example shown in FIG. 12, the yoke protrusion portion 72C is positioned radially inward of the hub protrusion portion 62C. The yoke protrusion portion 72C is press-fitted to the hub protrusion portion 62C. In the second fixing portion 82C, the outer circumferential surface of the yoke protrusion portion 72C makes contact with the inner circumferential surface of the hub protrusion portion 62C. This makes it possible to prevent the hub protrusion portion 62C from being displaced radially inward by the press-fitting load applied to the second fixing portion 82C. Accordingly, it is possible to prevent the ring-shaped member 33C from being displaced radially inward.

Figure 13:
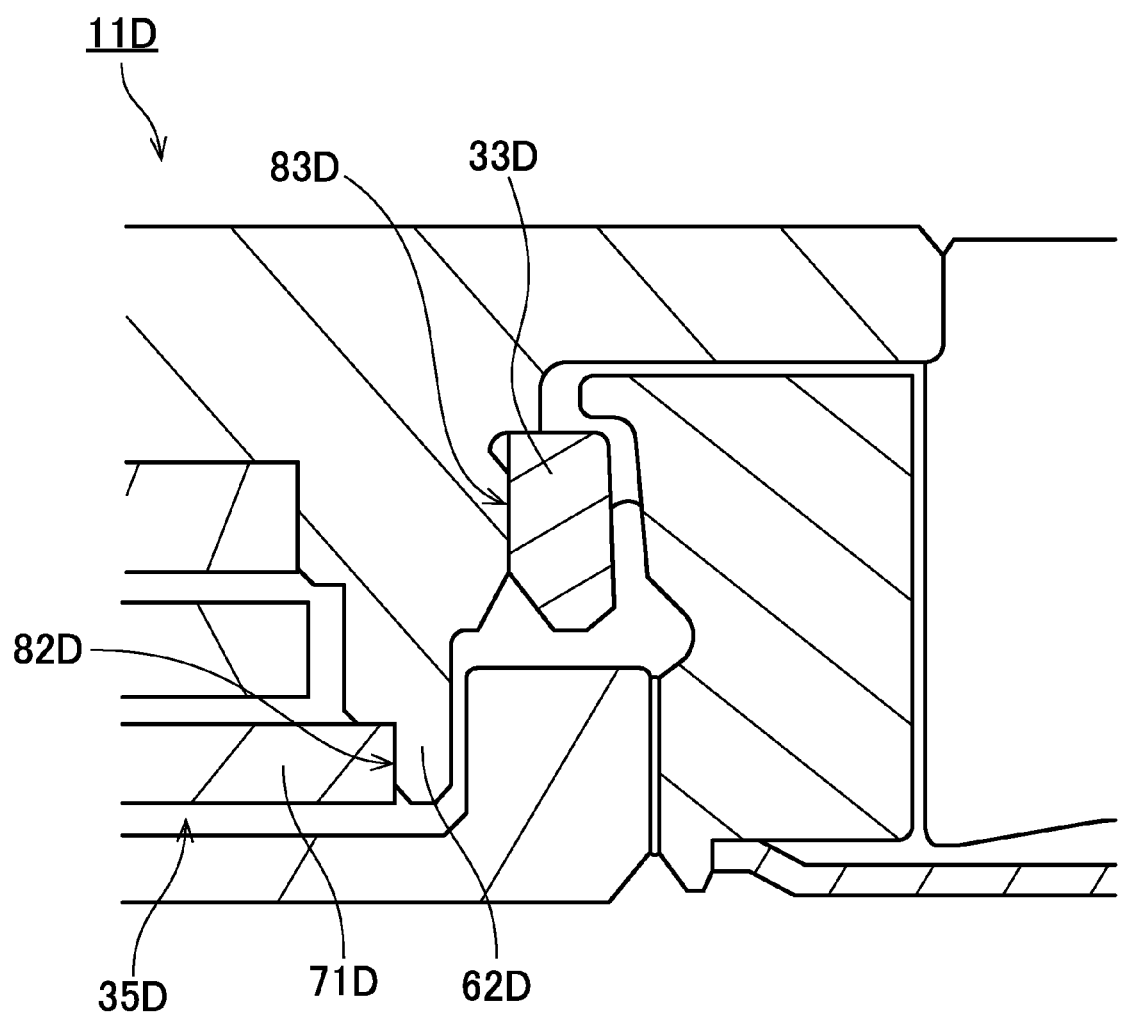
FIG. 13 is a partial vertical section view of a brushless motor according to another modified example.

FIG. 13 is a partial vertical section view of a brushless motor 11D according to another modified example. In the example shown in FIG. 13, the rotor yoke 35D does not include any yoke protrusion portion. In other words, the rotor yoke 35D is composed of only a disc portion 71D. In the second fixing portion 83 D, the inner circumferential surface of the disc portion 71D makes contact with the inner circumferential surface of the hub protrusion portion 62D. This makes it easy to manufacture the rotor yoke 35D. Moreover, the axial position of the second fixing portion 82D can be spaced apart downward from the axial position of the third fixing portion 82D. Accordingly, it is possible to restrain the ring-shaped member 33D from being displaced radially inward.

Figure 14:
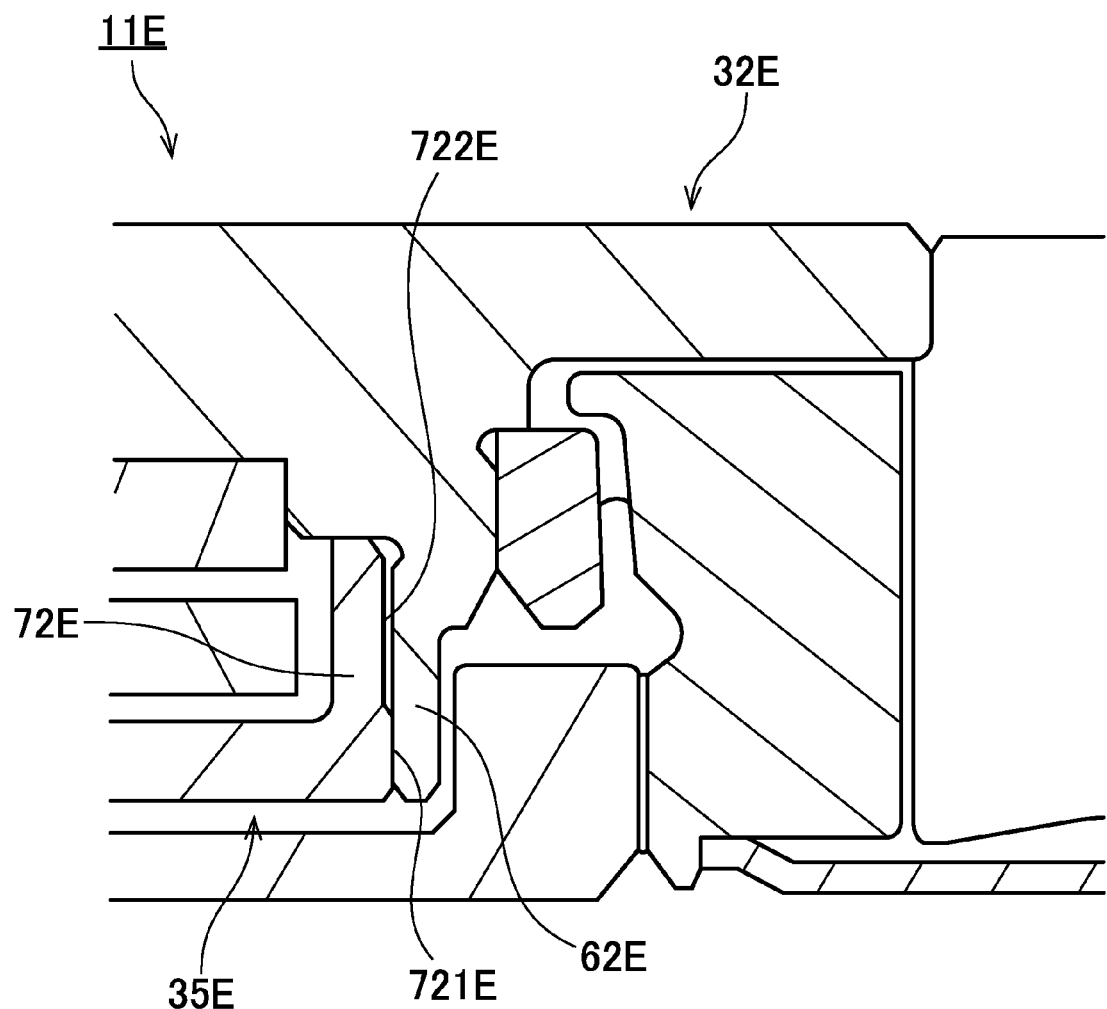
FIG. 14 is a partial vertical section view of a brushless motor according to a further modified example.

FIG. 14 is a partial vertical section view of a brushless motor 11E according to a further modified example.

In the example shown in FIG. 14, the inner circumferential surface of the yoke protrusion portion 72E includes a yoke-side contact surface 721E and a yoke-side opposing surface 722E positioned above the yoke-side contact surface 721E. The yoke-side contact surface 721E protrudes radially inward of the yoke-side opposing surface 722E. For that reason, in the example shown in FIG. 14, only the yoke-side contact surface 721E makes contact with the outer circumferential surface of the hub protrusion portion 62E. The yoke-side opposing surface 722E is radially opposed to the outer circumferential surface of the hub protrusion portion 62E across a gap.

When manufacturing the brushless motor 11E, the hub protrusion portion 62E is inserted into the radial inner side of the yoke-side opposing surface 722E. Thereafter, the hub protrusion portion 62E is press-fitted to the yoke-side contact surface 721E. This makes it possible to restrain the hub 32E from being inclined with respect to the rotor yoke 35E in the press-fitting process. Accordingly, it becomes possible to accurately fix the hub 32E with respect to the rotor yoke 35E.

Figure 15:
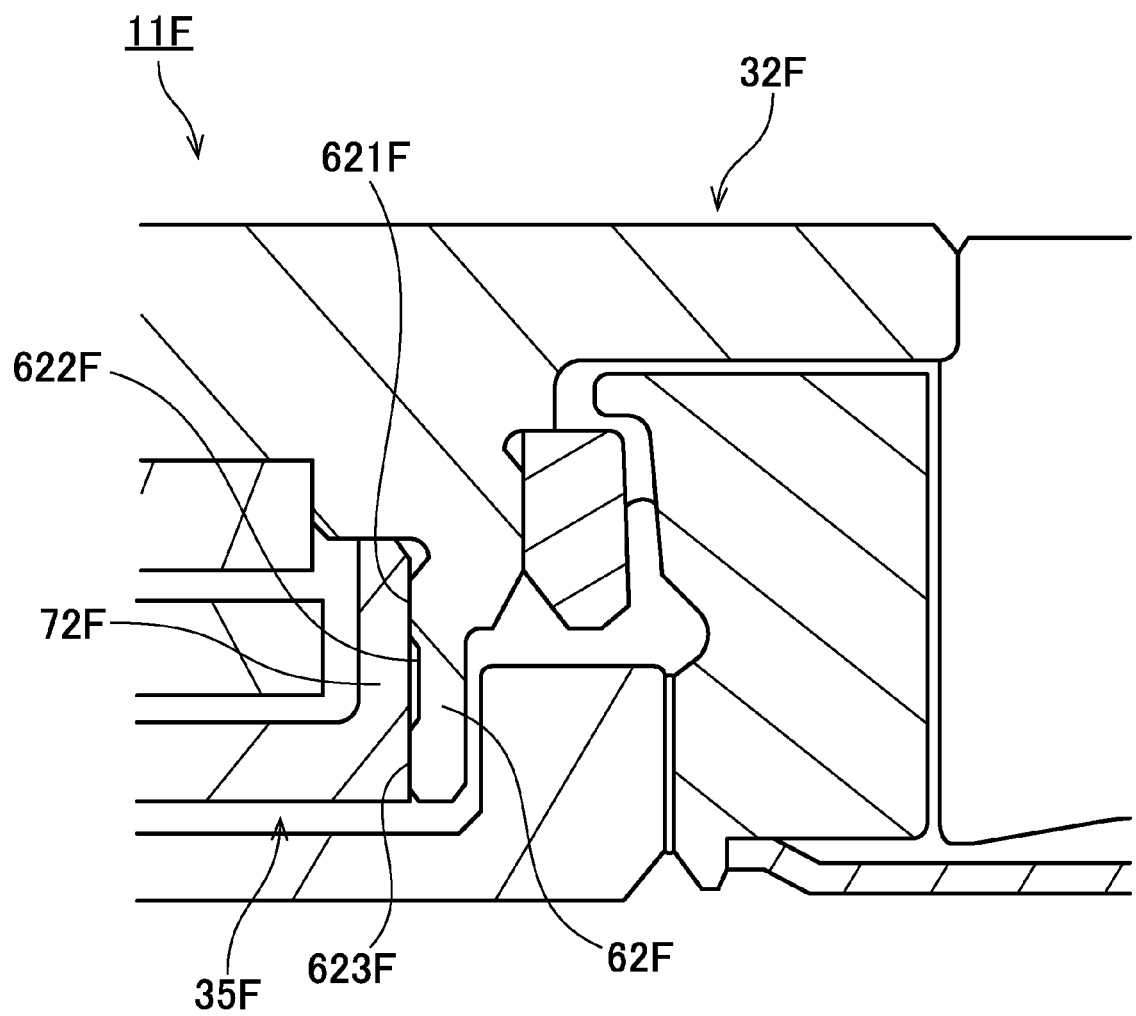
FIG. 15 is a partial vertical section view of a brushless motor according to a still further modified example.

FIG. 15 is a partial vertical section view of a brushless motor 11F according to a still further modified example. In the example shown in FIG. 15, the outer circumferential surface of the hub protrusion portion 62F includes a pair of hub-side contact surfaces 621F and 623F arranged in an axially spaced-apart relationship and a hub-side opposing surface 622F positioned between the hub-side contact surfaces 621F and 623F. The hub-side contact surfaces 621F and 623F protrude radially outward of the hub-side opposing surface 622F. For that reason, in the example shown in FIG. 15, only the hub-side contact surfaces 621F and 623F make contact with the inner circumferential surface of the yoke protrusion portion 72F. The hub-side opposing surface 622F is radially opposed to the inner circumferential surface of the yoke protrusion portion 72F across a gap.

In the example shown in FIG. 15, the hub protrusion portion 62F makes contact with the yoke protrusion portion 72F at two upper and lower points. Thus, the hub 32F is restrained from being inclined with respect to the rotor yoke 35F. In addition, the fixing strength of the rotor yoke 35F and the hub 32F becomes higher.

The bearing mechanism may be a fluidic dynamic-pressure bearing mechanism as employed in the second and third preferred embodiments or may be other kinds of bearings such as an oil-containing sintered bearing, a ball bearing and a slide bearing. The member defining the outer circumferential surface of the bearing mechanism may be a cup-shaped housing for holding the sleeve or an outer race of a ball bearing.

The brushless motor of the present invention may be a so-called fixed-shaft-type motor in which a shaft belongs to a stationary unit and a sleeve belongs to a rotary unit. In this case, the outer circumferential surface of the shaft or the outer circumferential surface of the ring-shaped member fixed to the shaft makes up the outer circumferential surface of the bearing mechanism. The outer circumferential surface of the shaft or the outer circumferential surface of the ring-shaped member is fixed to the inner circumferential surface of the base member.

As another modification, the outer circumferential surface of the bearing mechanism may be press-fitted to the inner circumferential surface of the base member. In other words, the inner circumferential surface of the base member may make contact with the outer circumferential surface of the bearing mechanism in the first fixing portion. In addition, an adhesive agent may be used in combination when the outer circumferential surface of the bearing mechanism is press-fitted to the base member.

As a further modification, the hub protrusion portion may be fixed to the rotor yoke by an adhesive agent. In the second fixing portion, the inner circumferential surface of the rotor yoke may be radially opposed to the outer circumferential surface of the hub protrusion portion across a gap. An adhesive agent exists in the gap. In addition, an adhesive agent may be used in combination when the hub protrusion portion is press-fitted to the rotor yoke.

As a still further modification, the magnets may be arranged below the armature. For example, the magnets may be fixed to the upper surface of the rotor yoke. In other words, the magnets may be fixed to the hub or the rotor yoke and may be opposed to one of the upper and lower surfaces of the armature. The hub and the rotor yoke may be formed of a single member.

As a yet still further modification, the hub may be made of a non-magnetic material such as aluminum or the like. In this case, for example, a magnetic body making up the top plate portion and the hub protrusion portion may be fixed to the lower surface of the hub made of a non-magnetic material.

The brushless motor and the disk drive apparatus of the present invention may be used to rotate a disk other than the magnetic disk, e.g., an optical disk.

The specific shapes of the respective members may differ from those shown in the respective figures of the subject application.

The respective elements appearing in the preferred embodiments and the modified examples described above may be combined appropriately as long as no conflict arises.

What is claimed is:

1. A brushless motor, comprising:
a stationary unit comprising a base member and a bearing mechanism; and
a rotary unit rotatably supported by the bearing mechanism, the rotary unit comprising a hub, a shaft, a rotor yoke and a magnet, the shaft having a central axis,
wherein the stationary unit comprises:
a flat armature arranged radially outward of the bearing mechanism to extend in a direction orthogonal to the center axis; and
a base member arranged to support the armature, the base member including a base through-hole extending in the up-down direction, wherein the hub is made of a magnetic material, the hub comprising:

a top plate portion comprising an inner peripheral end, a middle portion and an outer peripheral end, the top plate portion extended from the inner peripheral end through a middle portion to reach an outer peripheral end, the inner peripheral end contacting the shaft, the top plate portion further comprising a first part and a second part, the first part located radially inside the middle portion, the second part located radially outside the middle portion; and a hub protrusion portion arranged to extend downward from the middle portion of the top plate portion, wherein the rotor yoke is made of a magnetic material, the rotor yoke fixed to a radially outer side of the hub protrusion portion such that the rotor yoke is axially opposed to a lower surface of the armature, wherein the magnet is fixed to a lower surface of the second part of the hub such that the magnet is axially opposed to an upper surface of the armature while an upper surface of the magnet is entirely covered by the second part of the top plate portion, wherein the base member includes an inner circumferential surface defining the base through-hole, the bearing mechanism axially opposed to the first part of the top plate portion, the bearing mechanism including an outer circumferential surface, the inner circumferential surface of the base member arranged to make contact with the outer circumferential surface of the bearing mechanism or to radially oppose the outer circumferential surface of the bearing mechanism across an adhesive agent in a first fixing portion, wherein the rotor yoke is arranged to make contact with the hub protrusion portion or to radially oppose the hub protrusion portion across an adhesive agent in a second fixing portion, and wherein the brushless motor satisfies a relationship of d1>d2, where the d1 is an axial length between a lower end of a constant diameter surface of the bearing mechanism extending along the first fixing portion or further extending downward from the first fixing portion and an upper end of a constant diameter surface of the base member extending along the first fixing portion or further extending upward from the first fixing portion, and the d2 is an axial length between a lower end of a constant diameter surface of the hub protrusion portion extending along the second fixing portion or further extending downward from the second fixing portion and an upper end of a constant diameter surface of the rotor yoke extending along the second fixing portion or further extending upward from the second fixing portion.

2. The brushless motor of claim 1, wherein the rotor yoke includes a disc portion arranged below the armature and above the base member to extend in a ring shape and a substantially cylindrical yoke protrusion portion arranged radially inward of the armature to extend upward from the disc portion, the yoke protrusion portion making contact with the hub protrusion portion in the second fixing portion.

3. The brushless motor of claim 2, wherein the yoke protrusion portion is positioned radially outward of the hub protrusion portion, an inner circumferential surface of the yoke protrusion portion making contact with an outer circumferential surface of the hub protrusion portion in the second fixing portion.

4. The brushless motor of claim 2, wherein the yoke protrusion portion is positioned radially inward of the hub protrusion portion, an outer circumferential surface of the yoke protrusion portion making contact with an inner circumferential surface of the hub protrusion portion in the second fixing portion.

5. The brushless motor of claim 1, wherein the hub protrusion portion includes a hub-side contact surface making contact with the rotor yoke and a hub-side opposing surface positioned below the hub-side contact surface and radially opposed to the rotor yoke across a gap.

6. The brushless motor of claim 1, wherein the rotor yoke includes a yoke-side contact surface making contact with the hub protrusion portion and a yoke-side opposing surface positioned above the yoke-side contact surface and radially opposed to the hub protrusion portion across a gap.

7. The brushless motor of claim 1, wherein the rotary unit further includes a ring-shaped member positioned radially inward of the hub protrusion portion, an inner circumferential surface of the hub protrusion portion arranged to make contact with an outer circumferential surface of the ring-shaped member or to radially oppose the outer circumferential surface of the ring-shaped member across an adhesive agent in a third fixing portion, a lubricant existing between the stationary unit and the rotary unit, the lubricant having a liquid level positioned radially inward of the ring-shaped member, the third fixing portion including a lower end positioned above an upper end of the second fixing portion.

8. The brushless motor of claim 1, wherein the base member includes a tubular surface radially opposed to an outer circumferential portion of the rotor yoke.

9. The brushless motor of claim 8, wherein the base member further includes a slant surface whose diameter grows smaller as the slant surface extends downward from a lower end portion of the tubular surface.

10. A disk drive apparatus, comprising:
the brushless motor of claim 1;
an access unit arranged to perform at least one of information reading and writing tasks with respect to a disk supported on the rotary unit of the brushless motor; and
a cover making up a housing in cooperation with the base member, the rotary unit and the access unit accommodated within the housing.

11. A brushless motor, comprising:
a stationary unit comprising a base member and a bearing mechanism; and
a rotary unit rotatably supported by the bearing mechanism, the rotary unit comprising a hub, a shaft, a rotor yoke and a magnet, the shaft having a central axis,
wherein the stationary unit comprises:
a flat armature arranged radially outward of the bearing mechanism to extend in a direction orthogonal to the center axis; and
a base member arranged to support the armature, the base member including a base through-hole extending in the up-down direction,
wherein the hub is made of a magnetic material, the hub comprising:
a top plate portion comprising an inner peripheral end, a middle portion and an outer peripheral end, the top plate portion extended from the inner peripheral end through a middle portion to reach an outer peripheral end, the inner peripheral end contacting the shaft, the top plate portion further comprising a first part and a second part, the first part located radially inside the middle portion, the second part located radially outside the middle portion; and
a hub protrusion portion arranged to extend downward from middle portion of the the top plate portion, wherein the rotor yoke is made of a magnetic material, the rotor yoke fixed to a radially outer side of the hub protrusion portion such that the rotor yoke is axially opposed to a lower surface of the armature, wherein the magnet is fixed to a lower surface of the second part of the hub such that the magnet is axially opposed to an upper surface of the armature while an upper surface of the magnet is entirely covered by the second part of the top plate portion, wherein the base member includes an inner circumferential surface defining the base through-hole, the bearing mechanism axially opposed to the first part of the top plate portion, the bearing mechanism including an outer circumferential surface, the inner circumferential surface of the base member arranged to make contact with the outer circumferential surface of the bearing mechanism or to radially oppose the outer circumferential surface of the bearing mechanism across an adhesive agent in a first fixing portion, wherein the rotor yoke is arranged to make contact with the hub protrusion portion or to radially oppose the hub protrusion portion across an adhesive agent in a second fixing portion, and wherein the brushless motor satisfies a relationship of $d1<d2$, where the d1 is an axial length between a lower end of a constant diameter surface of the bearing mechanism extending along the first fixing portion or further extending downward from the first fixing portion and an upper end of a constant diameter surface of the base member extending along the first fixing portion or further extending upward from the first fixing portion, and the d2 is an axial length between a lower end of a constant diameter surface of the hub protrusion portion extending along the second fixing portion or further extending downward from the second fixing portion and an upper end of a constant diameter surface of the rotor yoke extending along the second fixing portion or further extending upward from the second fixing portion.

12. The brushless motor of claim 11, wherein the rotor yoke includes a disc portion arranged below the armature and above the base member to extend in a ring shape and a substantially cylindrical yoke protrusion portion arranged radially inward of the armature to extend upward from the disc portion, the yoke protrusion portion making contact with the hub protrusion portion in the second fixing portion.

13. The brushless motor of claim 12, wherein the yoke protrusion portion is positioned radially outward of the hub protrusion portion, an inner circumferential surface of the yoke protrusion portion making contact with an outer circumferential surface of the hub protrusion portion in the second fixing portion.

14. The brushless motor of claim 12, wherein the yoke protrusion portion is positioned radially inward of the hub protrusion portion, an outer circumferential surface of the yoke protrusion portion making contact with an inner circumferential surface of the hub protrusion portion in the second fixing portion.

15. The brushless motor of claim 11, wherein the hub protrusion portion includes a hub-side contact surface making contact with the rotor yoke and a hub-side opposing surface positioned below the hub-side contact surface and radially opposed to the rotor yoke across a gap.

16. The brushless motor of claim 11, wherein the rotor yoke includes a yoke-side contact surface making contact with the hub protrusion portion and a yoke-side opposing surface positioned above the yoke-side contact surface and radially opposed to the hub protrusion portion across a gap.

17. The brushless motor of claim 11, wherein the rotary unit further includes a ring-shaped member positioned radially inward of the hub protrusion portion, an inner circumferential surface of the hub protrusion portion arranged to make contact with an outer circumferential surface of the ring-shaped member or to radially oppose the outer circumferential surface of the ring-shaped member across an adhesive agent in a third fixing portion, a lubricant existing between the stationary unit and the rotary unit, the lubricant having a liquid level positioned radially inward of the ring-shaped member, the third fixing portion including a lower end positioned above an upper end of the second fixing portion.

18. The brushless motor of claim 11, wherein the base member includes a tubular surface radially opposed to an outer circumferential portion of the rotor yoke.

19. The brushless motor of claim 18, wherein the base member further includes a slant surface whose diameter grows smaller as the slant surface extends downward from a lower end portion of the tubular surface.

20. A disk drive apparatus, comprising:
the brushless motor of claim 11;
an access unit arranged to perform at least one of information reading and writing tasks with respect to a disk supported on the rotary unit of the brushless motor; and
a cover making up a housing in cooperation with the base member, the rotary unit and the access unit accommodated within the housing.

* * * * *